… 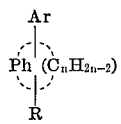

United States Patent Office 3,522,319
Patented July 28, 1970

3,522,319
PHENOL SUBSTITUTED TETRAHYDRONAPH-
THALENES USEFUL AS ESTROGENICS
William Laszlo Bencze, New Providence, and Charles
Ferdinand Huebner, Chatham, N.J., assignors to Ciba
Corporation, New York, N.Y., a corporation of
Delaware
No Drawing. Continuation-in-part of application Ser. No.
339,578, Jan. 23, 1964, which is a continuation-in-part
of application Ser. No. 222,627, Sept. 10, 1962, which
in turn is a continuation-in-part of application Ser. No.
160,291, Dec. 18, 1961. This application Mar. 13, 1964,
Ser. No. 351,842
Int. Cl. C07c *43/20, 43/22, 39/10*
U.S. Cl. 260—619          6 Claims

ABSTRACT OF THE DISCLOSURE

A class of α-phenyl-β-phenyl-tetrahydronaphthalenes useful as estrogenics.

---

This application is a continuation-in-part of application, Ser. No. 339,578, filed Jan. 23, 1964, now abandoned, which is in turn a continuation-in-part of application, Ser. No. 222,627, filed Sept. 10, 1962, now U.S. Pat. No. 3,234,211, which is in turn a continuation-in-part of application Ser No. 160,291, filed Dec. 18, 1961, now abandoned.

The present invention concerns basic ethers. More particularly, it relates to compounds having the formula:

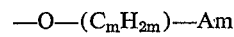

in which Ph is a 1,2-phenylene radical, Ar is a monocyclic aryl group substituted by tertiary amino-lower alkyl-oxy, in which tertiary amino is separated from oxy by at least two carbon atoms, R is an aryl radical, and the group of the formula —$(C_nH_{2n-2})$— stands for lower alkylene having from three to five chain carbon atoms, two of which carry the groups Ar and R, salts, N-oxides, salts of N-oxides or quaternary ammonium compounds thereof, as well as procedure for the preparation of such compounds.

The 1,2-phenylene (o-phenylene) radical Ph is unsubstituted or may be substituted by one or more than one of the same or different substituents attached to any of the four positions available for substitution. Substituents are primarily lower alkyl, e.g. methyl, ethyl, n-propyl, isopropyl and the like, etherified hydroxyl, especially lower alkoxy, e.g. methoxy, ethoxy, n-propyloxy, isopropyloxy, n-butyloxy and the like, as well as lower alkenyloxy, e.g. allyloxy and the like, or lower alkylenedioxy, e.g. methylenedioxy and the like, or esterified hydroxyl, particularly halogeno (representing hydroxyl esterified by a hydrohalic acid), e.g. fluoro, chloro, bromo and the like, as well as nitro, amino, or N-substituted amino, such as N,N-dilower alkylamino, e.g. N,N-dimethylamino, N,N-diethylamino and the like, trifluoromethyl, acyl, such as lower alkanoyl, e.g. acetyl, propionyl, pivalyl and the like, benzoyl, pyridoyl, e.g. nicotinoyl and the like, or any other suitable substituent. The 1,2-phenylene group Ph in the above formula is primarily 1,2-phenylene, (lower alkyl)-1,2-phenylene, (etherified hydroxy)-1,2-phenylene, especially (lower alkoxy)-1,2-phenylene, as well as (lower alkenyloxy)-1,2-phenylene or (lower alkylenedioxy)-1,2-phenylene and the like, or (esterified hydroxy)-1,2-phenylene, particularly (halogeno)-1,2-phenylene and the like, as well as (nitro)-1,2-phenylene, (amino)-1,2-phenylene, (N-substituted amino)-1,2-phenylene, such as (N,N-di-lower alkyl-amino)-1,2-phenylene, (trifluoromethyl)-1,2-phenylene, (acyl)-1,2-phenylene, such as (lower alkanoyl)1,2-phenylene, (benzoyl)-1,2-phenylene, (pyridoyl)-1,2-phenylene and the like, or any other suitably substituted 1,2-phenylene group.

The group of the formula —$(C_nH_{2n-2})$— represents lower alkylene having from three to five chain carbon atoms. The lower alkylene radical may be unbranched or branched and has preferably from three to seven carbon atoms (the letter *n* in the above group stands preferably for one of the integers 3, 4, 5, 6 and 7), three to five of which form the alkylene chain substituting the two adjacent positions 1 and 2 of the 1,2-phenylene radical Ph. Two of the chain carbon atoms of the alkylene radical, above all two adjacent chain carbon atoms, one of which is preferably adjacent to the 1,2-phenylene radical, carry the groups Ar and R. The alkylene radical represents a 1,3-propylene radical, e.g. 1,3-propylene, 1-methyl-1,3-propylene (or 3-methyl-1,3-propylene), 1,2-dimethyl-1,3-propylene (or 2,3-dimethyl-1,3-propylene), 2-methyl-1,3-propylene, 1-isopropyl-1,3-propylene (or 3-isopropyl-1,3-propylene) and the like, a 1,4-butylene radical, e.g. 1,4-butylene, 1-methyl-1,4-butylene (or 4-methyl-1,4-butylene), 2-methyl-1,4-butylene (or 3-methyl-1,4-butylene), 1,2-dimethyl-1,4-butylene (or 3,4-dimethyl-1,4-butylene), 2,3-dimethyl-1,4-butylene, 1-ethyl-1,4-butylene (or 4-ethyl-4-butylene), 1-ethyl-1,4-butylene (or 4-ethyl-1,4-butylene), 2-ethyl-1,4-butylene (or 3-ethyl-1,4-butylene) and the like, or a 1,5-pentylene radical, e.g. 1,5-pentylene, 1-methyl-1,5-pentylene (or 5-methyl-1,5-pentylene), 2-methyl-1,5-pentylene (or 4-methyl-1,5-phenylene) and the like. The compounds of this invention are, therefore, compounds of the indan, the 1,2,3,4-tetrahydro-naphthalene or the benzosuberane series.

A tertiary amino-lower alkyl-oxy-substituted monocyclic carbocyclic aryl group Ar has one or more than one tertiary amino-lower alkyl-oxy substituent, which may substitute any of the positions available for substitution. It is represented by the formula

in which the portion of the formula —$(C_mH_{2m})$— stands for lower alkylene, having preferably from two to seven carbon atoms (i.e. the letter *m* is preferably an integer from two to seven, both inclusive), and separates the tertiary amino group Am from the oxygen atom by at least two carbon atoms. The group of the formula —$(C_mH_{2m})$— stands preferably for alkylene having from two to three carbon atoms (i.e. the letter *m* stands primarily for an integer from two to three) and separates the teritary amino group Am from the oxygen atom by two to three carbon atoms. Such alkylene group is above all 1,2-ethylene, as well as 1-methyl-1,2-ethylene, 2-methyl-1,2-ethylene or 1,3-propylene, but may also be 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

A tertiary amino group, such as the group Am in the above formula, is, for example, N,N-di-substituted amino, in which each of the substituents is, for example, an aliphatic radical, such as lower alkyl, lower alkenyl and the like, a cycloaliphatic radical, such as cycloalkyl and the like, a cycloaliphatic-aliphatic radical, such as cycloalkyl-lower alkyl and the like, a carbocyclic aryl radical, such as monocyclic carbocyclic aryl and the like, a carbocyclic aryl-aliphatic radical, such as monocyclic carbocyclic aryl-lower alkyl and the like, or any other equivalent radical which have preferably from one to ten carbon atoms. Preferred as substituents are lower alkyl, e.g. methyl, ethyl, propyl, isopropyl, butyl, isobutyl, secondary butyl, pentyl, neopentyl and the like; other substituents of the above type are lower alkenyl, e.g. allyl, 2-methylallyl and the like, cycloalkyl having from three to seven, preferably from five to six, ring carbon atoms, e.g. cyclopentyl, cyclohexyl and the like, cycloalkyl-lower alkyl, in which cycloalkyl has from three to seven, preferably from five to six, ring carbon atoms, e.g. cyclopentylmethyl, 2-cyclohexylethyl and the like, monocyclic carbocyclic aryl, e.g. phenyl and the like, or monocyclic carbocyclic aryl-lower alkyl, such as phenyl-lower alkyl, e.g. benzyl, 1-phenylethyl, 2-phenylethyl and the like.

N,N-di-substituted amino groups representing the tertiary amino group Am are primarily N,N-di-lower alkylamino, in which lower alkyl has preferably from one to four carbon atoms, e.g. N,N-dimethylamino, N-methyl-N-ethylamino, N,N-diethylamino, N,N-di-n-propylamino, N,N-di-isopropylamino, N,N-di-n-butylamino and the like, as well as N-cycloalkyl-N-lower alkyl-amino, in which cycloalkyl has preferably from five to six ring carbon atoms, and lower alkyl has preferably from one to four carbon atoms, e.g. N-cyclopentyl-N-methyl-amino, N-cyclohexyl-N-methyl-amino, N-cyclohexyl-N-ethyl-amino and the like, or N-lower alkyl-N-phenyl-lower alkyl-amino, in which lower alkyl has preferably from one to four carbon atoms, e.g. N-benzyl-N-methyl-amino, N-benzyl-N-ethyl-amino, N-ethyl-N-(1-phenylethyl)-amino, N-methyl-N-(2-phenylethyl)-amino and the like, or any other equivalent N,N-di-substituted amino group. The above substituents, particularly lower alkyl, may also carry functional groups, such as hydroxyl, lower alkoxy, e.g. methoxy, ethoxy and the like, lower alkylmercapto, e.g. methylmercapto, ethylmercapto and the like, or any other suitable functional group; N,N-di-substituted-amino groups, in which the substituents carry functional groups, are, for example, N-hydroxy-lower alkyl-N-lower alkyl-amino, in which hydroxyl is separated from the amino-nitrogen by at least two, preferably by two to three, carbon atoms, e.g. N-(2-hydroxyethyl)-N-methyl-amino and the like, N,N-di-hydroxy-lower alkyl-amino, in which hydroxyl is separated from the amino-nitrogen by at least two, preferably by two to three, carbon atoms, e.g. N,N-di-(2-hydroxyethyl)-amino and the like.

The tertiary amino group, such as the group Am in the above formula, may also represent 1-N,N-alkylene-imino, in which alkylene has from four to eight carbon atoms, such as 1-pyrrolidino groups, e.g. 1-pyrrolidino, 2-methyl-1-pyrrolidino and the like, 1-piperidino groups, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino and the like, 1-N,N-aza-alkylene-imino groups, in which alkylene has from four to six carbon atoms, and the two nitrogen atoms are separated by at least two carbon atoms, particularly 1-N,N-(N-lower alkyl-aza-alkylene)-imino, in which alkylene has from four to six carbon atoms, and the two nitrogen atoms are separated by at least two carbon atoms, such as 1-piperazino or, particularly, 4-lower alkyl-1-piperazino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, or 1-N,N-oxa-alkylene, in which alkylene has preferably four carbon atoms, and the oxygen atom is separated from the nitrogen atom by two carbon atoms, such as 4-morpholino groups, e.g. 4-morpholino, 3-methyl-4-morpholino and the like, or 1-N,N-thia-alkylene-imino, in which alkylene has preferably four carbon atoms, such as 4-thiamorpholino groups, e.g. 4-thiamorpholino and the like, or any other equivalent tertiary amino group.

In the tertiary amino-lower alkyl-oxy group, the lower alkyl portion, either partially or in toto, may form part of a saturated heterocyclic ring system, of which the tertiary amino group Am is a ring member and is separated from the oxy group by at least two carbon atoms. Such tertiary amino-lower alkyl groups are, for example, 1-methyl-2-piperidinomethyl, 1-methyl-3-piperidinomethyl, 1-ethyl-4-piperidino, 1-methyl-3-pyrrolidinomethyl and the like.

Apart from the tertiary amino-lower alkyl-oxy group, the monocyclic carbocyclic aryl group Ar may have one or more than one additional substituent, which may be attached to any of the positions available for substitution. Such substituents are represented by lower alkyl, e.g. methyl, ethyl, isopropyl and the like, halogeno, e.g. fluoro, chloro, bromo and the like, halogeno-lower alkyl, e.g. trifluoromethyl and the like, or any other suitable substituent. As mentioned above, the group Ar may have more than one tertiary amino-lower alkyl-oxy group Ar may have more than one tertiary amino-lower alkyl-oxy group of the formula —O—$(C_mH_{2m})$—Am, in which Am and the group of the formula —$(C_mH_{2m})$— have the previously-given meaning.

The aryl group R attached to one of the carbon atoms of the alkylene group of the formula —$(C_nH_{2n-2})$—, above all the carbon atom adjacent to the carbon atom carrying the group Ar, is a carbocyclic aryl radical, particularly a monocyclic carbocyclic aryl radial, e.g. phenyl or substituted phenyl, in which one or more than one of the same or of different substituents may be attached to any of the positions available for substitution. Substituted phenyl groups are primarily (lower alkyl)-phenyl, in which lower alkyl has preferably from one to four carbon atoms and is, for example, methyl, ethyl, n-propyl, isopropyl, n-butyl and the like, (lower alkoxy)-phenyl, in which lower alkoxy has preferably from one to four carbon atoms, and represents, for example, methoxy, ethoxy, n-propyloxy, isopropyloxy, n-butyloxy and the like, or (halogeno)-phenyl, in which halogeno stands for fluoro, chloro, bromo and the like, as well as (nitro)-phenyl, (amino)-phenyl, (N,N-di-lower alkyl-amino)-phenyl, in which lower alkyl has preferably from one to four carbon atoms, and N,N-di-lower alkyl-amino is, for example, N,N-di-methyl-amino, N-ethyl-N-methyl-amino, N,N-diethylamino and the like, (trifluoromethyl)-phenyl and the like, as well as [Am—$(C_mH_{2m})$—O—]-phenyl, in which Am and the group —$(C_mH_{2m})$— have the previously-given meaning. The aryl radical representing R may also be a heterocyclic aryl group, particularly monocyclic heterocyclic aryl, such as pyridyl, e.g. 3-pyridyl, 4-pyridyl and the like.

Salts of the compounds of this invention are acid addition salts, such as pharmaceutically acceptable acid addition salts with inorganic acids, e.g. hydrochloric, hydrobromic, sulfuric, phosphoric acids and the like, or organic acids, such as organic carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic, naphthalene 2-sulfonic acid and the like. Other addition salts with acids may be useful as intermediates, for example, in the preparation of pharmaceutically acceptable, non-toxic acid addition salts or in the purification of the free compounds, as well as for identification or characterization purposes. Salts, which are prepared primarily for the latter, are, for example, those with acidic organic nitro compounds, e.g. picric, picrolonic, flavianic acid and the like, or metal complex acid, e.g. phosphotungstic, phosphomolybdic, chloroplatinic, Reinecke acid and the like. Mono- or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmaceutically acceptable, non-toxic acid addition salts of N-oxides, such as those with the above-mentioned acids.

Quaternary ammonium compounds of the compounds of this invention are those formed with reactive esters of alcohols and strong inorganic or organic acids, particularly those with lower aliphatic halides, sulfates, or sulfonates, such as lower alkyl halides, e.g. methyl, ethyl, n-propyl or isopropyl chloride, bromide, iodide and the like, di-lower alkyl sulfates, e.g. di-methyl sulfate, diethyl sulfate and the like, lower alkyl lower alkane sulfonates, e.g. ethyl or methyl methane sulfonate, ethane sulfonate and the like, lower alkyl lower hydroxy-alkane sulfonates, e.g. methyl 2-hydroxy-ethane sulfonate and the like, or lower alkyl monocyclic carbocyclic aryl sulfonates, e.g. methyl p-toluene sulfonate, ethyl p-toluene sulfonate and the like, as well as those with carbocyclic aryl-aliphatic halides, such as phenyl-lower alkyl halides, e.g. benzyl, 1-phenyl-ethyl or 2-phenylethyl chloride, bromide or iodide and the like. Also included as quaternary ammonium compounds are the corresponding quaternary ammonium hydroxides, and the quaternary ammonium salts with acids other than hydrohalic, sulfuric or organic sulfonic acids, particularly those with the organic carboxylic acids mentioned hereinabove.

The compounds of this invention have estrogenic properties, and are therefore useful in lieu of other estrogenic agents, e.g. estradiol, stilbestrol, hexestrol and the like, for example, in the treatment of animals to increase weight gain, efficiency of feed utilization and the like.

Furthermore, it has also been found that, when given to female rats, the compounds of this invention inhibit pregnancy; they are, therefore, useful as antifertility agents.

In addition, compounds of this invention have anti-fungal properties; for example, they show antidematophyte effects against fungi causing superficial dermatophytoses, such as *Trichophyton mentagrophytes, Trichophyton gallinae, Trichophyton interdigitale, Microsporum audouini, Microsporum canis, Microsporum gypseum* and the like, and are, therefore, useful in the treatment of infections caused by such micro-organisms, particularly of topical fungal infections of the skin, such as dermatophytosis (athlete's foot) and the like. They also have antifungal effects against fungi causing chronic infections of the skin and the subcutaneous tissue, such as *Sporotrichium schenkii* and the like, or fungi causing deep-seated systemic mycoses (yeasts) such as *Candida albicans, Cryptococcus neoformans, Histoplasma capsulatum* and the like, and are useful in the treatment of infections caused by such micro-organisms.

Furthermore, the compounds of this invention are active against actinomyces, such as *Nocardia atteroides* and the like, against bacteria, such as gram-positive bacteria, for example, *Diplococcus pneumoniae, Staphyloccus aureus* and the like, or gram-negative bacteria, for example, *Escherichia coli, Pseudomonas aeruginosa* and the like, and against protozoa, such as *Trichomonas vaginalis* and the like, and are, therefore, useful in the treatment of infections caused by such actinomyces, bacteria and protozoa of the above type.

Compounds of this invention, especially those having more than one tertiary amino-lower alkoxy group substituting the radical Ar, also have taeniacidal (anti-tapeworm) properties, and are, therefore, useful as taeniacides in the treatment of tapeworm infections, caused, for example, by *Hymenolepas nana, Dypilidium canium, Taenia pisiformis* and the like Particularly useful are the compounds having the following formula:

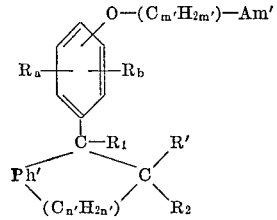

in which Ph' stands primarily for 1,2-phenylene, (lower alkyl)-1,2-phenylene, (lower alkoxy)-1,2-phenylene, or (halogeno) - 1,2 - phenylene, R' is phenyl, (lower alkyl)-phenyl, (lower alkoxy)-phenyl or (halogeno)-phenyl, each of the groups $R_1$ and $R_2$ is hydrogen or lower alkyl, the group of the formula —$(C_{n'}H_{2n'})$— stands for lower alkylene having preferably from one to five carbon atoms (i.e. the letter $n'$ stands for one of the integers from 1 to 5) separating the group Ph' from the carbon atom carrying the groups R' and $R_2$ by one to three carbon atoms, Am' stands for N,N-di-lower alkyl-amino, N,N-alkylene-imino, in which alkylene has preferably from four to seven carbon atoms, 4-morpholino or 4-lower alkyl-1-piperazino, the group of the formula —$(C_{m'}H_{2m'})$— stands for alkylene having from two to three, preferably two, carbon atoms (i.e. the letter $m'$ stands for one of the integers 2 and 3, preferably for the integer 2), and separates the group Am from the oxygen atom by two to three, preferably by two, carbon atoms, and each of the groups $R_a$ and $R_b$ is hydrogen, halogeno, especially chloro, or the group of the formula —O—$(C_{m'}H_{2m'})$—Am', in which Am' and the group of the formula —$(C_{m'}H_{2m'})$— have the previously-given meaning, and the acid addition salts, particularly the pharmaceutically acceptable acid addition salts, thereof. In the above compounds, the group of the formula —O—$(C_{m'}H_{2m'})$—Am' preferably substitutes the 4-position of the phenyl group.

The above group of compounds is represented by those of the following formulae:

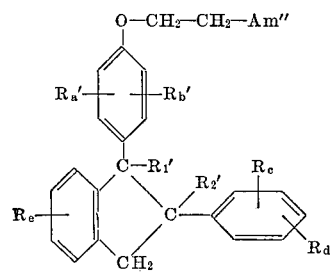

and

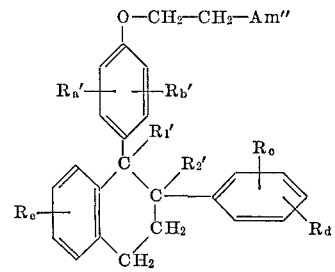

in which Am" is N,N-di-lower alkyl-amino or N,N-alkyl-ene-imino, in which alkylene has from four to seven carbon atoms, one of the groups $R_1'$ and $R_2'$ is hydrogen or lower alkyl, and the other is hydrogen, each of the groups $R_a'$ and $R_b'$ is hydrogen or the group of the formula

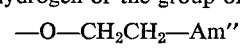

in which Am″ has the previously-given meaning, and each of the groups $R_c$, $R_d$ and $R_e$ is hydrogen, lower alkyl, lower alkoxy or halogeno, or acid addition salts, particularly pharmaceutically acceptable acid addition salts, thereof.

The compounds of this invention are useful in the form of compositions suitable for enteral, e.g. oral, or parenteral use; essentially, they comprise a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets, dragees and the like, in liquid form, for example, as solutions, suspensions and the like, or in the form of emulsions, e.g. salves, creams and the like. Suitable carrier materials, are, for example, starches, e.g. corn starch, wheat starch, rice starch and the like, sugars, e.g. lactose, glucose, sucrose and the like, stearic acid or salts thereof, e.g. magnesium stearate, calcium stearate and the like, stearyl alcohol, talc, gums, acacia, tragacanth, polyalkylene glycols, propylene glycol and the like. The quantity and the nature of the carrier ingredients can vary widely and depend, inter alia, upon the desired physical appearance or size of the composition, method of manufacture and the like. Encapsulation may be effected by using, if desired, the same excipients as those used for tablets. If necessary, the compositions having as the effective pharmacological ingredient one of the compounds of this invention, may contain other auxiliary substances, such as preserving, stabilizing, wetting, emulsifying agents and the like, salts for varying the osmotic pressure, buffers, etc. They may also contain, in combination, other pharmacologically useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic Law may be used for aesthetic purposes or as means of identification.

The compounds of the present invention are prepared according to methods known per se; for example, they are formed by converting in a compound of the formula:

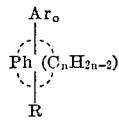
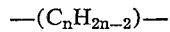

in which Ph, R and the group of the formula $$-(C_nH_{2n-2})-$$

have the previously-given meaning, and $Ar_o$ is a monocyclic carbocyclic aryl group substituted by $R_o$, the latter being a substituent capable of being converted into a tertiary amino-lower alkoxy group, in which tertiary amino is separated from the oxygen by at least two carbon atoms, or a salt thereof, the monocyclic carbocyclic aryl group $Ar_o$ substituted by $R_o$ into the monocyclic carbocyclic aryl group Ar substituted by tertiary amino-lower alkyl-oxy, and, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

In the starting material, the group $Ar_o$ may have one or more than one group $R_o$, which is converted into tertiary amino-lower alkyl-oxy in one step or in stages. A particularly suitable group $R_o$ capable of being converted into tertiary amino-lower alkoxy is hydroxy; its conversion into tertiary amino-lower alkyl-oxy is carried out according to known procedures. Usually, the starting material, in which $Ar_o$ is substituted by $R_o$ standing for hydroxyl, or preferably a salt thereof, is reacted with a reactive ester of a tertiary amino-lower alkanol, particulaly a compound of the formula Am—$(C_mH_{2m})$—X, in which Am and the group of the formula —$(C_mH_{2m})$— have the previously-given meaning, and X stands for a reactive esterified hydroxyl group. The latter is above all a hydroxyl group esterified with a strong mineral acid, such as a hydrohalic acid, e.g. hydrochloric, hydrobromic acid and the like; group X represents primarily halogeno, e.g. chloro, bromo and the like. It may also be a hydroxyl group esterified with a strong organic sulfonic acid, such as a lower alkane sulfonic acid, e.g. methane sulfonic, ethane sulfonic acid and the like, or a monocyclic carbocyclic aryl-sulfonic acid, e.g. p-toluene sulfonic acid and the like; the group X may, therefore, also stand for lower alkyl-sulfonyloxy, e.g. methylsulfonyloxy, ethylsulfonyloxy and the like, or monocyclic carbocyclic aryl-sulfonyloxy, e.g. p-tolylsulfonyloxy and the like. The preferred reactive esters of a tertiary amino-lower alkanol are those having the formula Am—$(C_mH_{2m})$—Hal, in which Am, and the group of the formula —$(C_mH_{2m})$— have the previously-given meaning, and Hal represents halogeno, particularly chloro.

As noted above, the starting material is preferably used in the form of a salt thereof. Such salt, for example, a metal salt, particularly an alkali metal salt, e.g. lithium salt, sodium salt, potassium salt and the like, as well as an alkaline earth metal salt, or any other suitable salt, is formed, for example, by treatment of the starting material with a metal salt-forming reagent, such as an alkali metal hydride or amide, e.g. lithium hydride, sodium hydride, sodium amide, potassium amide and the like, or any other suitable reagent, such as an alkali metal or alkaline earth metal lower alkoxide, e.g. lithium, sodium, potassium or barium methoxide, ethoxide, or tertiary butoxide, and the like, an alkali metal compound of a hydrocarbon, e.g. butyl lithium, phenyl lithium, phenyl sodium and the like. The preparation of the metal compound is usually carried out in the presence of an inert solvent, e.g. hexane, benzene, toluene, xylene, diethyl ether, p-dioxane, tetrahydrofuran, diethyleneglycol dimethylether, N,N-dimethylformamide and the like, or any other suitable solvent, such as a lower alkanol, e.g. methanol, ethanol and the like, or solvent mixture, if necessary, while cooling or at an elevated temperature, and/or in the atmosphere of an inert gas.

The reaction of the starting material, particularly a metal compound thereof, with the reactive ester of a tertiary amino-lower alkanol is carried out in the presence of a suitable diluent, for example, in the solvent or solvent mixture used for the preparation of a metal compound, if necessary, while cooling or at an elevated temperature, and/or, in the atmosphere of an inert gas, e.g. nitrogen. Formation of the metal compound of the starting material may also be achieved in situ; for example, the free starting material and the reactive ester of the tertiary amino-lower alkanol may be reacted in the presence of a salt-forming reagent, such as an alkali metal carbonate and the like.

Conversion of a hydroxyl group into the tertiary amino-lower alkyl-oxy group may also be achieved by treating the starting material in which $Ar_o$ is a monocyclic carbocyclic aryl radical substituted by hydroxyl representing $R_o$ with a tertiary amino-lower alkanol, in which the tertiary amino group is separated from the hydroxyl group by at least two carbon atoms, in the presence of a disubstituted carbonate. The latter is, for example, a diaryl carbonate, e.g. diphenyl carbonate and the like, or, more particularly, a di-lower alkyl carbonate, e.g. dimethyl carbonate, ethyl methyl carbonate, diethyl carbonate, dibutyl carbonate and the like. The reaction is carried out at an elevated temperature, for example, between about 100° and about 210°, preferably between about 180° and about 200°, and, if desired, in the presence of a transesterification catalyst enhancing the rate of the reaction, e.g. sodium, potassium, sodium carbonate, potassium carbonate, sodium aluminate and the like, a metal lower alkanolate, e.g. sodium ethanolate, titanium butylate and the like, or any other analogous reagent. The reaction is usually performed in the absence of an additional diluent, but may also be carried out in the presence of a further solvent or solvent mixture, if necessary, in a closed vessel and/or in the atmosphere of an inert gas, e.g. nitrogen and the like.

Another group $R_o$ capable of being converted into a tertiary amino-lower alkoxy group is the group of the formula —O—C(=O)—Y, in which Y represents halogeno or etherified hydroxyl. The group Y is particularly lower alkoxy, e.g. methoxy, ethoxy, n-butyloxy and the like, as well as phenyloxy or any other analogous etherified hydroxyl group, whereas halogeno, representing Y, is particularly chloro, as well as bromo and the like. Upon reacting a starting material having a group $Ar_o$ substituted by such group representing $R_o$ with a tertiary amino-lower alkanol, in which tertiary amino is separated from the hydroxyl group by at least two carbon atoms, the desired compound can be formed. The reaction is carried out under the previously-described conditions, i.e. at an elevated temperature, preferably at between 180° and 200°, and, if desired, in the presence of a transesterification reagent, such as one of those previously-described; the reaction may be carried out in the presence of a solvent or solvent mixture, if necessary, in the atmosphere of an inert gas, e.g. nitrogen.

A further group $R_o$ capable of being converted into a tertiary amino-lower alkoxy group is also a reactive esterified hydroxy-lower alkyl-oxy group. The latter is particularly a group of the formula —O—$(C_mH_{2m})$—X, in which X and the group of the formula —$(C_mH_{2m})$— have the previously-given meaning; the reactive esterified hydroxyl group X is primarily a group Hal representing halogeno, particularly chloro; it may also be a suitable organic sulfonyloxy group, such as one of those mentioned above.

A starting material having a group $Ar_o$ substituted by reactive esterified hydroxy-lower alkyl-oxy representing $R_o$ is reacted with a secondary amine, having preferably the formula H-Am, in which Am has the above-given meaning, to yield the desired compound. The reaction is preferably carried out in such manner, that an excess of the amine or of any other suitable base is present to neutralize the generated acid; however, the reaction may also be carried out in the presence of an acid-neutralizing agent, e.g. potassium carbonate and the like. If desired, the reaction mixture is diluted with a suitable solvent or solvent mixture; if necessary, the reaction is carried out while cooling or at an elevated temperature, and/or in the atmosphere of an inert gas, e.g. nitrogen, and/or in a closed vessel.

The starting materials, particularly those in which the monocyclic carbocyclic aryl group $Ar_o$ is substituted by hydroxyl representing $R_o$ and the salts thereof, such as the metal salts, especially the alkali metal salts, thereof, are new and are intended to be included within the scope of this invention. Apart from serving as starting materials, they exhibit pronounced estrogenic effects and are useful as estrogenic agents. Particularly useful are the starting materials of the formula

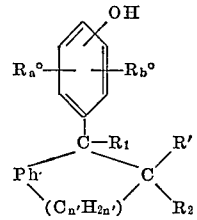

in which Ph', R', $R_1$, $R_2$ and the group of the formula —$(C_{n'}H_{2n'})$— have the previously given meaning, and each of the groups $R_a^o$ and $R_b^o$ is hydrogen, halogeno or hydroxyl, and a metal salt, especially an alkali metal salt, thereof. These compounds are represented by those of the formulae

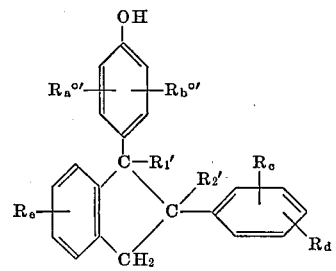

and

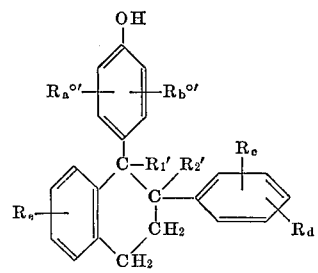

in which $R_1'$, $R_2'$, $R_c$, $R_d$ and $R_e$ have the previously given meaning, and each of the groups $R_a^{o'}$ and $R_b^{o'}$ is hydrogen or hydroxyl, or alkali metal salts thereof.

The starting mateirals used in the above reaction are prepared according to known methods. Thus, a starting material having a group $Ar_o$ substituted by hydroxyl representing $R_o$ may be prepared, for example, by reacting a compound having one of the formulae:

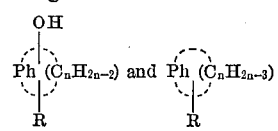

in which Ph and R have the previously-given meaning, the group of the formula —$(C_nH_{2n-2})$— is lower alkylene having from three to five chain carbon atoms, two of which carry the group R and the hydroxyl group —OH, and the group of the formula —$(C_nH_{2n-3})$— is lower alkenylene having from three to five chain carbon atoms, one of which carries the group R, with a compound of the formula H—$Ar_o$, in which $Ar_o$ has the previously-given meaning, but is preferably a monocyclic carbocyclic aryl radical, substituted by hydroxyl, in the presence of a suitable Lewis acid reagent, such as a strong inorganic acid, e.g. sulfuric acid and the like, or a Friedel-Crafts reagent, e.g. aluminum chloride and the like; this reaction is carried out according to known procedures.

The starting material, in which $Ar_o$ is a monocyclic carbocyclic aryl radical substituted by hydroxyl, is also obtained, for example, by reacting a compound of the formula

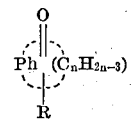

in which Ph and R have the previously-given meaning, and the group of the formula —$(C_nH_{2n-3})$— represents lower alkylene having from three to five chain carbon atoms, two of which are substituted by the group R and the oxo group =O, with a reagent of the formula $M^{\oplus}Ar_o'^{\ominus}$, in which $Ar_o'$ is a monocyclic carbocyclic aryl radical substituted by a group capable of being converted into a hydroxyl group (particularly lower alkoxy, e.g. methoxy, ethoxy and the like, as well as a benzyloxy group, e.g. benzyloxy, 1-phenylethyloxy and the like), and M⊕ is the cation of certain metals of the I–A-group of the Periodic System (i.e. of certain alkali metals), e.g. lithium, sodium and the like, or the group of the formula Hal—Mg⊕, in which Hal has the above-given meaning, i.e. is halogeno, e.g. chloro, bromo, iodo, and the like. In a resulting compound of the formula

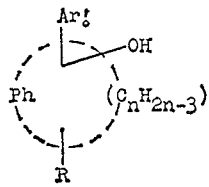

in which Ph, R and $Ar_o'$ have the previously-given meaning, and the group of the formula —$(C_nH_{2n-3})$— is lower alkylene having from three to five chain carbon atoms, two of which are substituted by R, $Ar_o'$ and the hydroxyl group, whereby $Ar_o'$ and the hydroxy group substitute the same carbon atom, the hydroxyl group may be replaced by hydrogen, for example, by hydrogenolysis (e.g. by hydrogenation in the presence of a suitable catalyst). In a resulting compound, the substituent of the group $Ar_{o2}$ which is capable of being converted into hydroxy group, is so converted (for example, by acid hydrolysis with an aqueous hydrohalic acid, e.g. hydrobromic acid and the like, by hydrogenolysis with hydrogen in the presence of a suitable catalyst, e.g. a palladium catalyst, or any other appropriate procedure), to yield the desired starting material.

Furthermore, in a starting material, in which the group $Ar_o$ is substituted by hydroxyl, the latter may be converted into the group O—C(=O)—Y, in which Y has the previously-given meaning, for example, according to any method suitable for the esterification of a phenolic hydroxyl group, such as formation of an alkali metal compound of the phenolic intermediate and reaction of the latter with an ester of the acid of the formula HO—C(=O)—Y or the halide thereof.

In addition, the group $R_o$ substituting $Ar_o$ in a resulting starting material, whenever representing hydroxyl, may be converted into a reactive esterified hydroxy-lower alkyl-oxy group by treating the starting material having such free hydroxyl group or a salt thereof with a lower alkylene-oxide, a halogeno-lower alkanol, in which halogeno is separated from hydroxyl by at least two carbon atoms, or with a lower alkylene halide, in which the two halogen atoms are separated by at least two carbon atoms, for example, a chloro-lower alkyl bromide, in which chloro is separated from bromo by at least two carbon atoms, and, if necessary, converting in a resutling compound in which $Ar_o$ is substituted by a hydroxy-lower alkyl-oxy substituent, the hydroxy group of such substituent into an esterified hydroxyl group (for example, by treatment with a thionyl halide, e.g. thionyl chloride and the like, a phosphorus halide, e.g. phosphorus tribromide and the like, or with an organic sulfonic acid halide, e.g. chloride and the like, in the presence of a suitable base, e.g. pyridine and the like).

The compounds of this invention are also prepared, for example, by replacing in a compound of the formula

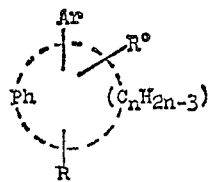

in which Ph, Ar and R have the previously-given meaning, R° is hydroxyl or esterified hydroxyl, and the radical of the formula —$(C_nH_{2n-3})$—is lower alkylene having from three to five chain carbon atoms, two or three of which carry the group Ar, R and R°, or a start thereof, the group R° by hydrogen, and, if desired, carrying out the optional steps.

A hydroxyl group —OH representing R° in the above starting material is preferably attached to the same carbon atom as the group Ar, especially if the latter substitutes one of the carbon atoms adjacent to the 1,2-phenylene radical; it may also be attached to the carbon atom carrying the group R, as well as to a branched carbon atom of the lower alkylene chain of the formula —$(C_nH_{2n-3})$—. It is replaced according to known methods, for example, by treating the starting material or an acid addition salt thereof with hydrogen in the presence of a catalyst, e.g. a platinum catalyst (for example, in the presence of methanol), Raney nickel and the like, if necessary, at an increased pressure and/or at an elevated temperature. It may also be removed by chemical reduction, for example, by treatment with zinc in the presence of an acid, e.g. hydrochloric acid, acetic acid and the like, with a metal amalgam, e.g. sodium amalgam and the like, in the presence of a moist solvent, e.g. diethyl ether and the like, with a light metal hydride, e.g. lithium aluminum hydride in the presence of aluminum chloride and the like, or any other suitable method.

An esterified hydroxyl group representing R° is primarily halogeno (i.e. hydroxyl esterified with a hydrohalic acid), e.g. chloro, brommo and the like. It is removed either by catalytic hydrogenation or by chemical reduction, e.g. by treatment with zinc in the presence of an acid.

The starting materials used in the above reaction are prepared according to known methods, for example, by reacting a compound of the formula

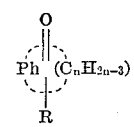

in which Ph and R have the previously-given meaning, and the group of the formula —$(C_nH_{2n-3})$— is lower alkylene having from three to five chain carbon atoms, two of which carry the group R and the oxo group of the formula =O, with a Grignard reagent of the formula HalMg⊕[Ar]⊖, in which Ar has the previously-given meaning, and Hal is halogeno, e.g. chloro, bromo and the like, and carefully decomposing a resulting organometallic complex.

The starting material may also be prepared, for example, by reacting a compound of the formula

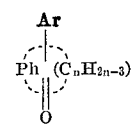

in which Ph, Ar and the group of the formula —$(C_nH_{2n-3})$— have the previously-given meaning, with a reagent of the formula HalMg⊕ [R]⊖, in which R and Hal have the previously-given means.

In a resulting starting material, the hydroxyl group may be converted into an esterified hydroxyl group, for example, into halogeno (for example, by treatment with a thionyl halide, e.g. thionyl chloride and the like, or a phosphorus halide, e.g. phosphorus bromide and the like).

The intermediates used in the above described Grignard reaction for the preparation of the starting materials are known or may be prepared according to known methods; the Grignard reagent may be prepared, for example, according to the "Method of Entrainment," described by Kharash and Reinmuth, Grignard Reactions of Nonmetallic Substances (Prentice Hall, 1954).

The compounds of this invention may also be prepared by converting in a compound of the formula

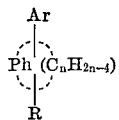

in which Ph, Ar and R have the previously-given meaning, and the group of the formula —($C_nH_{2n-4}$)— is lower alkenylene having from three to five chain carbon atoms, two of which carry the groups Ar and R, or a salt thereof, the lower alkylene radical of the formula —($C_nH_{2n-4}$)— into the desired lower alkylene radical of the formula —($C_nH_{2n-2}$)— having from three to five chain carbon atoms, two of which carry the groups Ar and R, and, if desired, carrying out the optional steps.

In the above starting material, the carbon atoms of the double bond of the lower alkylene radical are usually substituted by the groups Ar and R, and the double bond is preferably in conjugation with the aromatic 1,2-phenylene radical. Its removal is carried out according to methods known per se, for example, by treatment with an alkali metal, e.g. sodium and the like, in the presence of a lower alkanol, with metal amalgam in the presence of a hydrogen donor, e.g. sodium amalgam in the presence of moist diethyl ether, catalytically activated hydrogen, such as hydrogen in the presence of a platinum catalyst and the like, or any other suitable method, such as those mentioned above.

The starting materials used in the above reaction may be prepared, for example, by eliminating in the previously-described starting materials of the formula

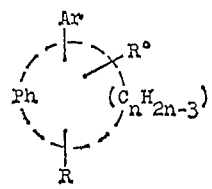

in which Ph, Ar, R, R° and the group of the formula —($C_nH_{2n-3}$) have the previously-given meaning, the compound of the formula H—R°, in which R° has the previously-given meaning.

The group R°, which is above all hydroxyl, usually substitutes the carbon atom carrying the group Ar, but may also be attached to the carbon atom carrying the group R. Removal of water by dehydration is achieved, for example, by heating the intermediate compound, in which R° is hydroxyl, or, more preferably, by treatment of the intermediate with a dehydrating reagent, especially an acidic dehydrating agent, such as an inorganic acid, e.g. hydrochloric, hydrobromic, hydriodic, sulfuric acid and the like, an inorganic acid halide, e.g. thionyl chloride, phosphorus chloride and the like, or any other suitable inorganic acidic reagent, e.g. ammonium chloride and the like, as well as an organic acid, e.g. p-toluene sulfonic acid and the like, an organic acid halide, e.g. acetic acid chloride, p-toluene sulfonyl chloride and the like, an organic acid anhydride, e.g. acetic acid anhydride, propionic acid anhydride and the like, or any other suitable organic acidic dehydrating reagent, e.g. pyridine hydrochloride and the like. If necessary, the reaction is carried out in the presence of a suitable solvent or solvent mixture, preferably at an elevated temperature, in a closed vessel, and/or in the atmosphere of an inert gas, e.g. nitrogen. An esterified hydroxyl group representing R°, such as halogeno, is removed together with hydrogen in the form of the acid, for example, by heating or, if necessary, by treatment with a base.

A resulting salt is converted into the free base, for example, by treating it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or by treatment with a suitable hydroxyl ion exchange resin.

A resulting salt, particularly a salt with an inorganic acid, can be converted into another salt according to known methods, for example, by reacting it with a suitable metal e.g. sodium, barium, silver and the like, salt of an acid, preferably in the presence of a diluent, in which a resulting inorganic salt is insoluble and is thus removed from the reaction. A salt may also be converted into another salt by treating it with an anion exchange preparation.

A free base is converted into an acid addition salt thereof according to known methods, for example, by reacting it or a solution thereof in a suitable solvent or solvent mixture with the acid or a solution thereof, or with a suitable anion exchange preparation, and isolating the desired salt. A salt may be obtained in the form of a hydrate thereof or may include solvent of crystallization.

An N-oxide of the compounds of this invention is prepared according to known methods, for example, by treating the free base with a suitable N-oxodizing reagent, such as hydrogen peroxide, ozone or a peracid, e.g. peracetic, perbenzoic, monoperphthalic, persulfuric acid and the like, in the presence of a suitable inert diluent. An N-oxide can be converted into a salt thereof according to the above procedure.

Quaternary ammonium derivatives of the compounds of the compounds of this invention are obtained according to known methods, for example, by reacting the base with the reactive ester of an alcohol and a strong acid, such as, for example, with one of the lower alkyl halides, di-lower alkyl-sulfates, lower alkyl organic sulfonates, phenyl-lower alkyl halides described above. The quaternizing reaction is performed in the absence or presence of a solvent, while cooling or at an elevated temperature, if necessary, in a closed vessel and/or in the atmosphere of an inert gas, e.g. nitrogen and the like.

Resulting quaternary ammonium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary amonium salt with a hydroxyl ion exchange preparation, by electrodialysis or any other suitable method. A quaternary ammonium hydroxide is converted into a quaternary ammonium salt by reacting the former with a suitable acid. A quaternary ammonium salt can also be converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt when treated with a suitable anion exchange preparation, can be converted into another quaternary ammonium salt. A quaternary amonium compound may be obtained in the form of a hydrate thereof or may contain solvent of crystallization.

A mixture of resulting isomeric compounds may be separated into the single isomers. For example, a mixture of disaster-eoisomers or a mixture of geometric cis-trans isomers is separated into the individual racemic compounds on the basis of physico-chemical differences, such as solubility, for example, by fractional crystallization, as well as by fractional distilltaion and the like. Racemates are resolved into the optically active d- and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric (l-tartaric) and L-tartaric (d-tartaric)

acid, as well as the optically active forms of malic, mandelic, camphor 10-sulfonic, quinic acid and the like. A resulting mixture of salts of the optically active acid with the antipodes of the base racemate is separated into the single salts on the basis of physico-chemical differences, for example, by fractional crystallization. From a resulting salt, the free and optically active base is obtained according to the method described above, and a free and optically active base can be converted into its acid addition salt, N-oxide, salt of an N-oxide or quaternary ammonium compound according to the procedures described above.

The invention also comprises any modification of the process wherein a compound formed as an intermediate at any stage of the process, is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitation thereon. Temperatures are given in degrees centigrade.

EXAMPLE 1

To a solution of 2.66 g. of 2-(4-chloro-phenyl)-1-(4-hydroxy-phenyl)-1,2,3,4-tetrahydro-naphthalene in a mixture of 30 ml. of N,N-dimethylformamide and 20 ml. of toluene is added 0.39 g. of a 53 percent suspension of sodium hydride in mineral oil. The resulting mixture is then treated with 1.07 g. of 2-N,N-diethylaminoethyl chloride in 5 ml. of toluene. After stirring at room temperature for twenty hours, the precipitated sodium chloride is filtered off, and the filtrate is concentrated to a volume of about 5 ml. and diluted with water. The organic material is extracted with three portions of diethyl ether; the combined organic extracts are washed with two portions of 2 N aqueous hydrochloric acid. The combined milky aqueous extracts are made basic with a dilute aqueous solution of sodium hydroxide and a dilute aqueous solution of sodium carbonate, and the organic material is extracted with diethyl ether. The organic solution is washed with a concentrated solution of sodium chloride in water, dried over sodium sulfate, and evaporated to yield 3.0 g. of a colorless oil which crystallizes to give the desired 2-(4-chloro-phenyl)-1 - [4 - (2 - N,N - diethylaminoethyl)-oxy-phenyl]-1,2,3,4-tetrahydro-naphthalene of the formula

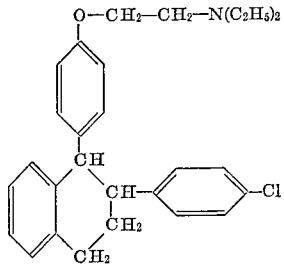

which melts at 81–82° after recrystallization from hexane.

An aqueous solution of the 2-(4-chloro-phenyl)-1-[4-(2 - N,N - diethylaminoethyl) - oxy - phenyl] - 1,2,3,4-tetrahydro-naphthalene citrate is obtained by dissolving 0.1 g. of 2-(4-chloro-phenyl)-1- [4-(2-N,N-diethylaminoethyl)-oxy-phenyl]-1,2,3,4-tetrahydronaphthalene and 0.1 g. of citric acid in 2 ml. of water.

When reacted with a 30 percent solution of hydrogen peroxide, the 2-(4-chloro-phenyl)-1-[4-(2-N,N-diethylaminoethyl)-oxy-phenyl] - 1,2,3,4-tetrahydro-naphthalene in methanol yields the 2-(4-chloro-phenyl)-1-[4-(2-N,N-diethylaminoethyl) - oxy - phenyl] - 1,2,3,4 - tetrahydro-naphthalene N-oxide; a methanol solution of the latter is reacted with an equivalent amount of picric acid and yields the 2-(4-chloro-phenyl)-1-[4-(2-N,N-diethylaminoethyl)-oxy-phenyl]1,2,3,4-tetrahydro-naphthalene N-oxide picrate.

A solution of 2-(4-chloro-phenyl)-1-[4-(2-N,N-diethylaminoethyl)-oxy-phenyl] - 1,2,3,4-tetrahydro-naphthalene in acetone is treated with a ten percent excess of methyl iodide to yield the 2-(4-chloro-phenyl)-1-[4-(2-N,N-diethylaminoethyl)-oxy-phenyl] - 1,2,3,4-tetrahydro-naphthalene methiodide.

The starting material used in the above procedure is prepared as follows: To a solution of 167 g. of 4-chloro-phenyl-acetonitrile in 1000 ml. of a 1:1-mixture of N,N-dimethylformamide and toluene is added in portions 48 g. of a 53 percent suspension of sodium hydride in mineral oil while stirring and cooling in an ice-bath. After the evolution of hydrogen ceases, a solution of 185 g. of 2-phenylethyl bromide in 200 ml. of toluene is added dropwise; the reaction mixture is stirred at room temperature for five hours and allowed to stand for twenty hours. The solvents are removed under reduced pressure; the oily residue is treated with water and the organic material is extracted with diethylether. The organic solution is washed with acetic acid and a saturated solution of sodium chloride in water, dried over sodium sulfate and evaporated to dryness. The resulting 2-(4-chloro-phenyl)-4-phenyl-butyronitrile is purified by distillation and collected at 202°/0.1 mm.; yield: 183 g.

A solution of 183 g. of 2-(4-chloro-phenyl)-4-phenyl-butyronitrile in 720 ml. of 95 percent ethanol is added to 360 g. of sodium hydroxide in 360 ml. of water, and the mixture is heated under reflux for three days. The major portion of the ethanol is distilled off under reduced pressure, and the aqueous portion is made acidic with dilute hydrochloric acid while cooling in an ice bath. The resulting precipitate is extracted with two portions of diethyl ether and one portion of ethyl acetate; the organic solutions are cleared by filtration through a wet layer of a diatomaceous earth preparation, combined and washed with a saturated aqueous solution of sodium chloride, dried over sodium sulfate and evaporated to dryness. The remaining viscous oil crystallizes from a mixture of hexane and pentane to yield 152 g. of 2-(4-chloro-phenyl)-4-phenyl-butyric acid, M.P. 82–84°.

To a solution of 153 g. of 2-(4-chloro-phenyl)-4-phenyl-butyric acid in 500 ml. of diethyl ether are added 25 drops of pyridine and dropwise 50 ml. of thionyl chloride while stirring and cooling in an ice-bath. The reaction mixture is then refluxed for thirty minutes, and the diethyl ether is stripped off. The residue is diluted with 50 ml. of benzene and the solvent is evaporated under reduced pressure; this procedure to remove the unreacted thionyl chloride is repeated three times.

The residue is then taken up into 500 ml. of benzene and, while stirring and cooling in an ice-bath, the solution is treated dropwise with a mixture of 75 ml. of stannic chloride in 100 ml. of benzene. The reaction mixture is then allowed to warm to room temperature and is stirred for one hour; after cooling, it is treated dropwise with 500 ml. of 2 N hydrochloric acid while stirring. The organic layer is separated and a aqueous phase is extracted twice with ethyl acetate; the organic solutions are combined, washed five times with an aqueous solution of sodium carbonate, and with an aqueous solution of sodium chloride, dried over sodium sulfate and evaporated to dryness. The resulting 2-(4-chloro-phenyl)-1,2,3,4-tetrahydro-naphthalen-1-one is recrystallized from a mixture of benzene and petroleum ether, M.P. 108–109°; yield: 110 g.

A solution of 20.0 g. of 2-(4-chloro-phenyl)-1,2,3,4-tetrahydro-naphthalen-1-one in 50 ml. of tetrahydrofuran is diluted with 50 ml. of ethanol. The clear solution is treated with 2.0 g. of sodium borohydride, which is added in portions, and is then stirred for four hours at room temperature, allowed to stand overnight and again stirred for two hours. After being diluted with aqueous acetic acid and water, the reaction mixture is taken to dryness; the residue is diluted with water, and the organic material is extracted with three portions of ethyl acetate. The organic solution is washed with a concentrated aqueous solution of sodium chloride, dried over sodium sulfate and evaporated. The resulting 2-(4-chloro-phenyl)-1,2,3,4-tetrahydro-naphthalen-1-ol is recrystallized from ethanol, M.P. 132–134°; yield: 10.8 g.

A mixture of 10.4 g. of 2-(4-chloro-phenyl)-1,2,3,4-tetrahydro-naphthalen-1-ol and 4.0 g. of phenol is dissolved in 80 ml. of 1:1-mixture of benzene and hexane at about 50°, and is added dropwise to a stirred mixture of 8.0 g. of phenol and 2.7 g. of aluminum chloride while cooling with running cold water. After stirring at about 20° for five hours, the reaction mixture is allowed to stand at room temperature for 2½ days and is then poured onto a 1:1-mixture of ice and concentrated hydrochloric acid. The organic material is extracted three times with diethyl ether; the organic extract is washed with water and saturated aqueous solution of sodium chloride, dried over sodium sulfate and evaporated to dryness.

The residual viscous oil is taken up into 100 ml. of 2 N aqueous sodium hydroxide; the aqueous phase is decanted, and the gummy material is collected. It is suspended in water, and the suspension is made acidic with 2 N aqueous hydrochloric acid. The organic material is extracted with three portions of diethyl ether, the organic solution is washed with a saturated solution of sodium chloride, dried over sodium sulfate and evaporated to yield a viscous oil. The desired 2-(4-chlorophenyl) - 1 - (4-hydroxy-phenyl) - 1,2,3,4 - tetrahydronaphthalene is obtained by distilling the latter and collecting it at 205–210°/0.1 mm.; yield: 7.4 g. It crystallizes from a mixture of diethyl ether and pentane and melts at 140–142° after recrystallization from a mixture of diethyl ether, hexane and pentane by evaporating the diethyl ether.

EXAMPLE 2

To a solution of 5.0 g. of 2-phenyl-1-(2,3,4-trihydroxyphenyl)-1,2,3,4-tetrahydro-naphthalene in 30 ml. of N,N-dimethylformamide is added in portions 2.18 g. of a 53 percent suspension of sodium hydride in mineral oil while stirring in an ice bath. The mixture is stirred at room temperature until the evolution of hydrogen ceases, and is then treated with 28.5 ml. of a toluene solution of 2-N,N-diethylaminoethyl chloride (containing 0.216 g. of the base per ml. or a total of 6.15 g. of 2-N,N-diethylaminoethyl chloride). The resulting mixture is stirred for an additional three hours, allowed to stand overnight at room temperature and is then evaporated to dryness under reduced pressure. The residue is diluted with water, and the mixture (pH about 9) is extracted three times with diethyl ether. The combined organic extracts are washed three times with 2 N aqueous hydrochloric acid; the combined aqueous extracts are adjusted to pH 8 with concentrated aqueous ammonia, and extracted three times with diethyl ether. The combined organic extracts are washed with a saturated aqueous solution of sodium chloride, dried over sodium sulfate and evaporated to dryness under reduced pressure to yield 7.0 g. of the crude oily 2-phenyl-1-[2,3,4-tri-(2-N,N-diethylaminoethyl)-oxy-phenyl]-1,2,3,4-tetrahydro-naphthalene of the formula

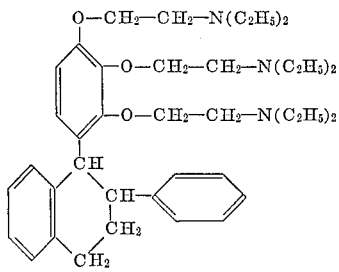

which is purified by chromatography on aluminum oxide (activity III). The desired compound is eluted with a 1:1-mixture of benzene and hexane, with benzene and with benzene containing 20 percent of diethyl ether; a total of 6.0 g. of the pure compound is recovered.

The trihydrochloride of 2-phenyl-1-[2,3,4-tri-(2-N,N-diethylaminoethyl) - oxy - phenyl] - 1,2,3,4 - tetrahydronaphthalene is obtained by treating a solution of the latter with a solution of hydrogen chloride in ethyl acetate. The starting material used in the above procedure is prepared as follows: To 1.2 ml. of sulfuric acid in 30 ml. of glacial acetic acid is added 12.6 g. of pyrogallol while stirring in an ice bath. The resulting mixture is treated with 22.4 g. of 2-phenyl-1,2,3,4-tetrahydro-naphthalen-1-ol in 45 ml. of acetic acid, which is added dropwise over a period of 45 minutes while keeping the temperature at about 15°. The latter is then allowed to rise to room temperature, whereupon a clear solution results, which is poured into water after standing for 2½ days. The pH is adjusted to 5 with sodium carbonate, and the mixture is extracted three times with diethyl ether. The combined organic extracts are washed with an aqueous solution of sodium hydrogen carbonate, swirled with sodium chloride, dried over sodium sulfate and evaporated to dryness under reduced pressure. The resulting glassy 2-phenyl - 1 - (2,3,4-trihydroxy-phenyl)-1,2,3,4-tetrahydro-naphthalene crystallizes slowly from hexane and is recrystallized from benzene and hexane, M.P. 161–163°.

A mixture of 1.8 g. of 2-phenyl-1-(2,3,4-trihydroxyphenyl)-1,2,3,4-tetrahydro-naphthalene in 4 ml. of pyridine and 3 ml. of acetic anhydride is allowed to stand at room temperature for twenty hours. The solvent and the reagent are evaporated under reduced pressure; the residue is taken up into benzene and crystallizes upon diluting the solution with hexane. The resulting 2-phenyl-1-(2,3,4-triacetyloxy-phenyl) - 1,2,3,4 - tetrahydro-naphthalene melts at 125–126° after recrystallization from a mixture of ethanol and water.

EXAMPLE 3

To a solution of 8.0 g. of 2-(3,4-dichloro-phenyl)-1-(2,3,4-trihydroxy-phenyl)-1,2,3,4-tetrahydro-napthalene in 40 ml. of N,N-dimethylformamide is added in small portions 2.88 g. of a 53 percent suspension of sodium hydride in mineral oil while stirring and cooling in an ice-bath. After the evolution of hydrogen ceases, 37.6 ml. of a toluene solution of 2-N,N-diethylaminoethyl chloride (containing 0.216 g. of the base per ml. or a total of 8.13 g. of 2-N,N-diethylaminoethyl chloride) is added in a slow stream. The reaction mixture is stirred for three hours and left over night and again stirred for two hours, all at room temperature, and is then diluted with diethyl ether and filtered. The filtrate is evaporated to dryness under reduced pressure, the residue is diluted with water, and the mixture is extracted three times with ethyl acetate. The combined organic solutions are extracted twice with 2 N aqueous hydrochloric acid, and the combined acidic extracts are treated with a charcoal preparation, filtered and made basic (pH about 8) with concentrated aqueous ammonia. The aqueous solution is again extracted several times with ethyl acetate, the combined organic extracts are swirled with sodium chloride, decanted, dried over sodium sulfate and evaporated to dryness under reduced pressure to yield 9.2 g. of a dark oil which is chromatographed on 360 g. of aluminum oxide (neutral, activity III), using as the starting solvent a 1:1-mixture of hexane and benzene and taking 50 ml. portions. 1.3 g. of oily product A is eluted with benzene, and with benzene containing 20 percent of diethyl ether (fractions No. 18 to 29), 2.7 g. of oily product B with benzene containing 20 percent of diethyl ether (fractions No. 30 to 32), and 2.2 g. of oily product C with benzene containing 20 percent of diethyl ether, with benzene containing 50 percent of diethyl ether, and with benzene (fractions 33 to 52). Product B analyzes correctly for the desired 2-(3,4-dichloro-phenyl) - 1 - [2,3,4 - tri - (2-N,N-diethylamino-ethyl)-oxy-phenyl]-1,2,3,4-tetrahydro-naphthalene of the formula

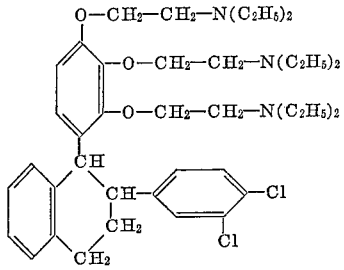

Its trihydrochloride is prepared by reacting a solution 2-(3,4-dichloro-phenyl) - 1 - [2,3,4 - tri - (2-N,N-diethyl-aminoethyl) - oxy-phenyl]-1,2,3,4-tetrahydro-naphthalene with a solution of hydrogen chloride in ethyl acetate.

The starting material used in the above procedure is prepared as follows: A stirred solution of 64.8 g. of potassium cyanide in 48 ml. of water is refluxed and treated dropwise with 156.4 g. of α,3,4-trichloro-toluene in 300 ml. of 95 percent of ethanol while heating to gentle reflux. The reaction mixture is refluxed for four hours, then cooled and filtered. The solid material is washed with 95 percent ethanol, and the combined filtrate and washings are evaporated to dryness. Water is added to the residue, and the organic material is extracted with diethyl ether. The organic extract is swirled with solid sodium chloride, decanted, dried over sodium sulfate, filtered and evaporated under reduced pressure. The resulting 3,4-dichloro-phenylacetonitrile is purified by distillation and collected at 165–170°/13 mm., which crystallizes upon refrigration; yield: 120.4 g.

A solution of 50.0 g. of 3,4-dichloro-phenylacetonitrile in 300 ml. of N,N-dimethylformamide is cooled in an ice-bath and treated with portions of 12.9 g. of a 53 percent sodium hydride suspension in mineral oil. After the vigorous evolution of hydrogen ceases, a solution of 49.7 g. of 2-phenylethyl bromide in 300 ml. of toluene is added in a stream while cooling in an ice-bath. The reaction mixture is stirred for five hours, and allowed to stand overnight at room temperature; after filtering and washing the solid material with benzene and diethyl ether, the combined organic solutions are evaporated to dryness under reduced pressure. The residue is taken up in water, and the organic material is extracted four times with diethyl ether. The organic solution is swirled with sodium chloride, decanted, dried over sodium sulfate, and evaporated under reduced pressure to yield 75.6 g. of a dark-red oil which is distilled. The desired 2-(3,4-dichloro-phenyl)-4-phenyl-butyronitrile is collected at 150–188°/0.08 mm.

A mixture of 53.9 g. of 2-(3,4-dichloro-phenyl)-4-phenyl-butyronitrile, 125 g. of a 50 percent aqueous solution of sodium hydroxide and 185 ml. of ethylene glycol is refluxed for five hours and is then poured into a mixture of ice and water. The mixture is then extracted with diethyl ether and made strongly acidic with concentrated hydrochloric acid. The organic material is extracted with three portions of diethyl ether; the combined organic extracts are swirled with sodium chloride, decanted, dried over sodium sulfate, filtered and evaporated to dryness. The desired 2-(3,4-dichloro-phenyl)-4-phenyl-butyric acid is obtained by distilling the residue and collected at 180–207°/0.08 mm.; yield: 40.0 g.

A solution of 40.0 g. of 2-(3,4-dichloro-phenyl)-4-phenyl-butyric acid in 182 ml. of diethyl ether is refluxed with 6 drops of pyridine and 12 ml. of thionyl chloride for 45 minutes. The solvent is then removed under reduced pressure, and the residue is taken up into 31 ml. of benzene; the solution is again taken to dryness under reduced pressure, and the treatment with benzene is repeated twice. The resulting 2-(3,4-dichloro-phenyl)-4-phenyl-butyric chloride is dissolved in 182 ml. of benzene and treated dropwise with 38.6 g. (17.5 ml.) of stannic chloride in 31 ml. of benzene while stirring and cooling in an ice-bath. The reaction mixture is stirred at room temperature for one hour and then treated dropwise with 62 ml. of a 1:7-mixture of concentrated hydrochloric acid and water. After stirring for thirty minutes, the organic layer is separated, washed with water, twice with a 2 N aqueous solution of sodium carbonate and again with water, and is swirled with sodium chloride; after decanting, the solution is dried over sodium sulfate and evaporated under reduced pressure. The solid residue is suspended in petroleum ether and filtered off to yield the 2-(3,4-dichloro-phenyl)-1,2,3,4 - tetrahydro - naphthalen-1-one, which melts at 100–101° after recrystallization from 95 percent ethanol; yield: 25.7 g.

A stirred solution of 14.6 g. of 2-(3,4-dichloro-phenyl)-1,2,3,4-tetrahydro-naphthalen-1-one in 250 ml. of 95 percent ethanol and 50 ml. of benzene is treated with 2.3 g. of sodium borohydride. The reaction mixture is stirred overnight, evaporated under reduced pressure and the residue is treated with water and with 2 N hydrochloric acid. The aqueous mixture is extracted with three portions of chloroform; the organic solution is swirled with sodium chloride, decanted, dried over sodium sulfate, filtered and evaporated under reduced pressure. The resulting colorless oil crystallizes slowly on standing to yield 12.8 g. of 2-(3,4-dichloro-phenyl)-1,2,3,4 - tetrahydro - naphthalen-1-ol, which melts at 96–98° after recrystallization from hexane.

To 10 ml. of acetic acid is added, while stirring and cooling in an ice-bath, 0.4 ml. of concentrated sulfuric acid and then 4.73 g. of pyragallol. The resulting thick slurry is stirred at about 6° while adding dropwise 11.0 g. of 2-(3,4-dichloro-phenyl)-1,2,3,4-tetrahydro-naphthalen-1-ol in 15 ml. of acetic acid. The reaction mixture is stirred at room temperature for 2½ days and is then poured into water. The pH is adjusted to about 5 with sodium carbonate, and the aqueous mixture is extracted three times with diethyl ether. The combined organic extracts are washed with a dilute sodium hydrogen carbonate solution, swirled with sodium chloride, decanted, dried over sodium sulfate, filtered and evaporated to dryness under reduced pressure to yield 13.9 g. of the sticky yellow 2 - (3,4 - dichloro-phenyl) - 1 - (2,3,4-trihydroxy-phenyl)-1,2,3,4-tetrahydro-naphthalene, which does not crystallize and is used without further purification.

EXAMPLE 4

To a solution of 8.04 g. of 2-(4-chloro-phenyl)-1-(4-hydroxy-phenyl)-1,2,3,4-tetrahydro-naphthalene in a mixture of 25 ml. of N,N-dimethylformamide and 15 ml. of toluene is added in portions 2.4 g. of a 53 percent suspension of sodium in mineral oil. After the hydrogen evolution ceases, 2.1 g. of ethylene chlorohydrin in 20 ml. of toluene is slowly added while stirring. The reaction mixture is allowed to stand at room temperature for twenty hours and then filtered; the filtrate is concentrated under reduced pressure to a volume of about 25 ml. and diluted with water. The organic material is extracted with benzene, the organic solution is washed with a saturated aqueous solution of sodium chloride, and a small amount of benzene is distilled off azeotropically to remove traces of water.

The resulting benzene solution of 2-(4-chloro-phenyl)-1-[4-(2-hydroxy-ethyl)-oxy-phenyl]-1,2,3,4 - tetrahydro-naphthalene is cooled in an ice-bath and treated dropwise with a solution of 5 ml. of thionyl chloride in 25 ml. of benzene. The reaction mixture is allowed to warm to room temperature and is then heated to about 50° until the evolution of hydrogen chloride and sulfur dioxide ceases. The resulting reaction mixture is concentrated under reduced pressure to a volume of about 20 ml., diluted with 50 ml. of benzene and again concentrated to about 30 ml. to remove traces of thionyl chloride.

The resulting benzene solution of 1-[4-(2-chloroethyl)-oxy-phenyl]-2-(4 - chloro-phenyl) - 1,2,3,4, - tetrahydro-naphthalene is treated with 15 ml. of N,N-diethylamine; the reaction mixture is diluted with 50 ml. of benzene and is then heated under reflux for two hours. Upon working up the reaction mixture according to the procedure described in Example 1, the desired 2-(4-chloro-phenyl)-1-[4-(2-N,N-diethylaminoethyl) - oxy - phenyl] - 1,2,3,4-tetrahydro-naphthalene is obtained, which melts at 81–82° after recrystallization from hexane.

EXAMPLE 5

To a solution of 8.4 g. of 2-(4-chloro-phenyl)-1-(4-hydroxy-phenyl)-1,2,3,4-tetrahydro-naphthalene in 50 ml. of N,N-dimethylformamide and 50 ml. of toluene is added 1.2 g. of a 53 percent suspension of sodium hydride in mineral oil while stirring and cooling in an ice-bath. To the resulting solution is added dropwise 3.5 g. of 2-(1-pyrrolidino)-ethyl chloride in 5 ml. of toluene while stirring and cooling at 5°; stirring is continued for six hours at room temperature. The reaction mixture is allowed to stand overnight, and is then diluted with diethyl ether; the solid material is filtered off, and the filtrate is concentrated under reduced pressure to a volume of about 10 ml. and diluted with water. After standing for 2½ days while cooling, the organic material is extracted with three portions of diethyl ether; the organic solution is washed three times with 2 N hydrochloric acid. The organic layer is discarded; the mixture of the combined acidic layers and the precipitate is adjusted to pH 8 by adding an aqueous solution of ammonia and sodium carbonate. The organic material is extracted with ethyl acetate and two portions of diethyl ether; the organic extracts are washed with a saturated aqueous solution of sodium chloride, dried over sodium sulfate and evaporated to dryness to yield 9.6 g. of the viscous 2-(4-chloro-phenyl)-1-{4-[2 - (1-pyrrolidino)-ethyl]-oxy-phenyl}-1,2,3,4-tetrahydro-naphthalene of the formula

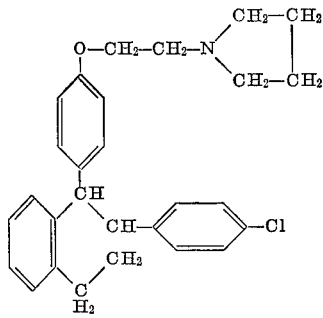

which crystallizes from hexane, M.P. 91–93°.

EXAMPLE 6

A solution of 6.74 g. of 1-(4-hydroxy-phenyl)-2-phenyl-5,6,7,8-tetrahydro-naphthalene, containing one-half mole of diethyl ether of crystallization, in 50 ml. of N,N-dimethylformamide and 35 ml. of toluene is treated with 0.96 g. of a 53 percent suspension of sodium hydride in mineral oil while stirring and cooling. The resulting cold solution is then treated with 2.7 g. of 2-N,N-diethylaminoethyl chloride in 13.5 ml. of toluene, and after stirring for 20 hours at 30°, the reaction mixture is diluted with diethyl ether. The inorganic material is filtered off, and the filtrate is concentrated under reduced pressure to a volume of about 20 ml. and diluted with water. The organic material is extracted with three portions of diethyl ether, which are combined and are washed with three portions of 2 N hydrochloric acid. The acidic solutions are made basic (pH about 9) with aqueous ammonia, and are then extracted with three portions of diethyl ether. The organic solutions are combined, washed, dried and evaporated to yield 7.8 g. of the viscous oily 1-[4-(2-N,N-diethylaminoethyl)-oxy-phenyl] - 2 - phenyl-1,2,3,4-tetrahydro-naphthalene of the formula

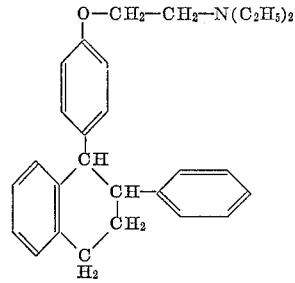

which crystallizes spontaneously, and is recrystallized from a mixture of hexane and petroleum ether. A total of 3.15 g. of a crystalline product is obtained, which is distilled and collected at 205°/0.1 mm., and melts at 57–58°. The mother liquors are taken to dryness to yield 4.5 g. of an oily product, which is dissolved in diethyl ether; the organic solution is treated with a saturated solution of hydrogen chloride in diethyl ether to yield 4.93 g. of the 1-[4-(2-N,N-diethylaminoethyl)-oxy-phenyl]-2-phenyl - 1,2,3,4 - tetrahydro-naphthalene hydrochloride, which melts at 161–162° after recrystallization from a mixture of acetone, diethyl ether and pentane.

The starting material used in the above procedure is prepared as follows: A mixture of 44.8 g. of 2-phenyl-1,2,3,4-tetrahydro-naphthalen-1-ol and 18.8 g. of phenol in 100 ml. of a 1:1-mixture of benzene and hexane is treated dropwise over a period of two hours with a solution of 13.3 g. of aluminum chloride in 37.6 g. of phenol while stirring and cooling in an ice-bath to 5–10°. The ice-bath is then removed and stirring is continued at room temperature for twelve hours; after standing for sixty hours, the reaction mixture is again stirred for four hours at about 38–40°, and is then poured onto a mixture of 100 g. of ice and 100 ml. of concentrated hydrochloric acid. A total of 50 ml. of diethyl ether is added; the organic layer is separated, and the aqueous mixture is extracted with two additional portions of diethyl ether. The combined ether extracts are washed twice with aqueous solutions of sodium acetate, dried over sodium sulfate, filtered and evaporated to dryness. The excess of phenol is removed by distillation (collected at 75°/13 mm. and a bath temperature of 170°), to leave 66.5 g. of a glassy residue.

The latter is dissolved in the same amount of diethyl ether and poured slowly into 500 ml. of a 10 percent aqueous solution of sodium hydroxide while stirring and keeping it at 50°. The diethy lether evaporates, and the precipitate is filtered off to yield 66.0 g. of the sodium salt of 1-(4-hydroxy-phenyl)-2-phenyl-1,2,3,4-tetrahydro-naphthalene, which is suspended in water acidified with 2 N hydrochloric acid. The organic material is extracted with three portions of diethyl ether; the organic solutions are combined, washed with water, an aqueous solution of sodium acetate, and an aqueous solution of sodium chloride, dried over sodium sulfate, and evaporated to dryness, yield: 51.0 g. The resulting 1-(4-hydroxy-phenyl)-2-phenyl-1,2,3,4-tetrahydronaphthalene is crystallized from 100 ml. of hexane and about 2 ml. of diethyl ether. A first crop (yield: 20.5 g.) melts at 68–71°, and the second crop (yield: 9.2 g.) melts at 66–70°; a total of 17.3 g. of a glassy residue can be obtained from the mother liquors.

The crystalline material has one-half mole of diethyl ether of crystallization, which is eliminated by distillation and collecting the 1-(4-hydroxy-phenyl)-2-phenyl-1,2,3,4-tetrahydronaphthalene at 186–190°/0.1 mm.

EXAMPLE 7

A solution of 7.62 g. of the oily 1-(4-hydroxy-phenyl)-2-phenyl-1,2,3,4-tetrahydro-naphthalene (of the fraction weighing 17.3 g., obtained from the mother liquors described in Example 6) in 50 ml. of N,N-dimethylformamide and 25 ml. of toluene is treated with 1.22 g. of a 53 percent suspension of sodium hydride in mineral oil while cooling, and is then treated with 3.45 g. of 2-N,N-diethylaminoethyl chloride in 18 ml. of toluene while cooling. After stirring for twenty hours at room temperature, the reaction mixture is worked up as described in Example 6 to yield 9.1 g. of an oily 1-[4-(2-N,N-diethylaminoethyl)-oxy-phenyl] - 2 - phenyl-1,2,3,4-tetrahydro-naphthalene, which cannot be crystallized by seeding it with a sample of the product obtained according to the procedure of Example 6. A small sample is converted into the hydrochloride, M.P. 150–153°.

EXAMPLE 8

To a solution of 1-(4-hydroxy-phenyl)-2-phenyl-1,2,3,4-tetrahydro-naphthalene containing one-half mole of diethyl ether of crystallization in 50 ml. of N,N-dimethylformamide and 50 ml. of toluene is added in three portions a total of 1.2 g. of a 53 per cent suspension of sodium hydride in mineral oil while stirring and cooling. After thirty minutes, a clear solution is attained, which is treated dropwise with 3.5 g. of 2-(1-pyrrolidino)-ethyl chloride in 5 ml. of toluene while cooling. The temperature is allowed to rise slowly to room tempreature, and the reaction mixture is stirred for an additional six hours. After standing overnight, diethyl ether is added, the inorganic material is filtered off, and the filtrate is evaporated to dryness under reduced pressure. Water is added to the residue; after standing for 2½ days, the organic material is extracted with three portions of diethyl ether. The organic solutions are combined, and washed with three portions of 2 N hydrochloric acid. Three layers are formed; the organic phase is discarded, and the aqueous solution and the precipitate are combined and adjusted to pH 8 with a concentrated aqueous solution of ammonia and sodium carbonate. The organic material is extracted with one portion of ethyl acetate and two portions of diethyl ether; the organic extracts are washed with an aqueous solution of sodium chloride, dried over sodium sulfate and evaporated to dryness under reduced pressure to yield 5.5 g. of the oily 2-phenyl-1-{4-[2-(1-pyrrolidino)-ethyl]-oxy-phenyl}1,2,3,4-tetrahydro-naphthalene of the formula

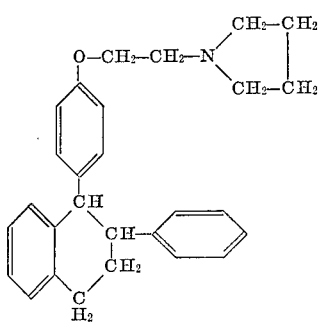

Its hydrochloride is prepared by adding a saturated solution of hydrogen chloride in diethyl ether to a solution of the base in a 5:1-mixture of diethyl ether and acetone; it melts at 190–193°, and is recrystallized from a 1:5:5-mixture of ethanol, acetone and diethyl ether.

EXAMPLE 9

The 2 - (4-chloro-phenyl)-1-[4-(2-N,N-diethylaminoethyl) - oxyphenyl]-2-methyl-1,2,3,4-tetrahydro-naphthalene of the formula

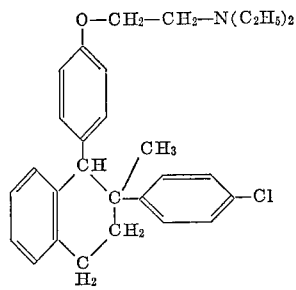

is prepared by reacting a solution of 2-(4-chloro-phenyl)-1 - (4 - hydroxy - phenyl)-2-methyl-1,2,3,4-tetrahydro-naphthalene in N,N-dimethylformamide and toluene with a 53 percent suspension of sodium hydride in mineral oil, and then with a ten per cent excess of 2-N,N-diethylaminoethyl chloride according to the procedure described in Example 5.

The starting material used in the above procedure is prepared as follows: To a solution of 25.6 g. of 2-(4-chloro - phenyl)-1,2,3,4-tetrahydro-naphthalen-1-one in 100 ml. of N,N-dimethylformamide and 50 ml. of toluene is added in portions a total of 4.8 g. of a 53 percent suspension of sodium hydride in mineral oil while stirring and cooling in an ice-bath. After the hydrogen evolution ceases (i.e. after about two hours), a solution of 15.0 g. of methyl iodide in 50 ml. of toluene is added slowly. After stirring for two hours while cooling in an ice-bath, and five hours at room temperature, the reaction mixture is allowed to stand overnight and is then diluted with an equal amount of diethyl ether. The precipitate is filtered off and washed with ethyl acetate; the combined filtrate and washings are concentrated under reduced pressure to a volume of about 50 ml. and then diluted with water. The organic material is extracted with three portions of diethyl ether; the organic extracts are washed, dried and evaporated to dryness to yield a viscous oil. The desired 2 - (4-chloro-phenyl)-2-methyl-1,2,3,4-tetra-hydro-naphthalen-1-one crystallizes and is recrystallized from petroleum ether, M.P. 52–55°; a sample is distilled and the pure compound, melting at 52–54°, is collected at 130–135°/0.06 mm.

The 2 - (4-chloro-phenyl)-2-methyl-1,2,3,4-tetrahydro-naphthalen-1-ol is obtained by reducing the 2-(4-chloro-phenyl) - 2 - methyl-1,2,3,4-tetrahydro-naphthalen-1-one with sodium borohydride, and is then condensed with phenol in the presence of aluminum chloride according to the procedure described in Example 1 to yield the desired 2 - (4 - chloro-phenyl)-1-(4-hydroxy-phenyl)-2-methyl-1,2,3,4-tetrahydro-naphthalene starting material.

EXAMPLE 10

To a solution of 4.0 g. of 1-(4-hydroxy-phenyl)-2-phenyl-indan in 30 ml. of N,N-dimethylformamide and 30 ml. of toluene is added while cooling 0.7 g. of a 53 percent suspension of sodium hydride in mineral oil, followed by 1.9 g. of 2-N,N-diethylaminoethyl chloride. The reaction mixture is stirred overnight, and the organic precipitate is filtered off and washed with benzene and diethyl ether. The combined organic solutions are concentrated to a smaller volume; water is added, and the desired 1 - [4 - (2-N,N-diethylaminoethyl)-oxy-phenyl]-2-phenyl-indan of the formula

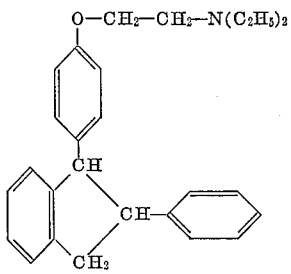

is extracted with diethyl ether. It is obtained by evaporating the solvent and purified by distillation, B.P. 205–210°/1.25 mm.

The starting material used in the above procedure is prepared as follows: To a solution of 58.0 g. of phenylacetonitrile in 150 ml. of N,N-dimethylformamide and 150 ml. of toluene is added while stirring and cooling, 23.3 g. of a 53 percent suspension of sodium hydride in mineral oil, followed by 86.0 g. of benzyl bromide in 50 ml. of toluene, which is added dropwise over a period of three hours. The reaction mixture is then allowed to stand overnight at room temperature; the solid material is filtered off and washed with benzene and diethyl ether. The organic solutions are combined and evaporated. The residue is taken up in water, and the aqueous mixture is extracted with diethyl ether. The organic solution is dried over magnesium sulfate, and evaporated, and the residue is distilled to yield the 2,3-diphenylpropionitrile, which is collected at 135–146°/0.9 mm.

A mixture of 46.0 g. of 2,3-diphenyl-propionitrile in 100 ml. of ethylene glycol and 40.0 g. of sodium hydroxide in 40 ml. of water is refluxed overnight, and is then poured into water. The organic material is extracted with diethyl ether; the organic phase is washed with water and a saturated aqueous solution of sodium chloride, dried and evaporated. The resulting 2,3-diphenyl-propionic acid solidifies on standing, M.P. 90–95°; yield: 38.0 g.

To a solution of 38.0 g. of 2,3-diphenyl-propionic acid in 100 ml. of benzene is slowly added 35.4 g. of phosphorus pentachloride, and the reaction mixture is refluxed for 45 minutes. The volatile material is removed to yield the 2,3-diphenyl-propionic acid chloride.

A benzene solution of the 2,3-diphenyl-propionic acid chloride is added dropwise to a suspension of 30.4 g. of aluminum chloride in 400 ml. of benzene; the reaction mixture is stirred at room temperature for 2½ hours and is then decomposed by adding 100 ml. of diethyl ether containing 20 percent of hydrochloric acid. The organic layer is separated, washed with an aqueous sodium carbonate solution, water and a saturated aqueous solution of sodium chloride, dried and evaporated. The resulting 2-phenyl-indan-1-one is crystallized from a mixture of benzene and petroleum ether, M.P. 73–75°; yield: 23.0 g.

A mixture of 16.5 g. of 2-phenyl-indan-1-one in 100 ml. of ethanol and 3.0 g. of sodium borohydride is refluxed for one hour. The solvent is removed under reduced pressure; water is added to the residue and the organic material is extracted with diethyl ether. The organic solution is dried and evaporated to yield 14.9 g. of the oily 2-phenyl-indan-1-ol, which is purified by distillation and collected at 127–130°/1.75 mm.

To a mixture of 10.0 g. of aluminum chloride and 8.0 g. of phenol is added dropwise a solution of 14.9 g. of 2-phenyl-indan-1-ol and 4.0 g. of phenol in 400 ml. of benzene and 100 ml. of hexane while cooling and stirring. The ice-bath is removed and stirring is continued overnight, and the reaction mixture is then poured into a mixture of ice and concentrated hydrochloric acid. The organic material is extracted with diethyl ether; the organic solution is dried and evaporated and yields the 1-(4-hydroxy-phenyl)-2-phenyl-indan, which is purified by distillation and collected at 230–235°/2 mm.

EXAMPLE 11

To a solution of 4.0 g. of 1-(4-hydroxy-phenyl)-2-phenyl-indan in 30 ml. of N,N-dimethylformamide and 30 ml. of toluene is added while cooling 0.7 g. of a 53 percent suspension of sodium hydride in mineral oil, followed by 1.87 g. of 2-(1-pyrrolidino)-ethyl chloride. The reaction mixture is stirred overnight, and the organic precipitate is filtered off and washed with benzene and diethyl ether. The combined organic solutions are concentrated to a smaller volume; water is added, and the desired 2-phenyl-1-{4-[2-(1-pyrrolidino)-ether]-oxy-phenyl} indan of the formula

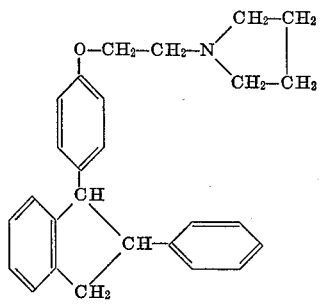

is extracted with diethyl ether. It is obtained by evaporating the solvent and purified by distillation, B.P. 170–175°/1.7 mm.

EXAMPLE 12

The following compounds are prepared according to the previously-described procedure by selecting the appropriate starting materials and reagents:

| Starting Materials | Reagents | Products |
| --- | --- | --- |
| 1-(4-hydroxy-phenyl)-1-methyl-2-phenyl-1,2,3,4-tetrahydro-naphthalene. | Sodium hydride+2-N,N-diethylaminoethyl chloride. | 1-[4-(2-N,N-diethylaminoethyl)-oxy-phenyl]-1-methyl-2-phenyl-1,2,3,4-tetrahydro-naphthalene. |
| 1-(4-hydroxy-phenyl)-2-phenyl-1,2,3,4-tetrahydro-naphthalene. | Sodium hydride+2-N,N-dimethyl aminoethyl chloride. | 1-[4-(2-N,N-dimethylaminoethyl)-oxy-phenyl]-2-phenyl-1,2,3,4-tetrahydro-naphthalene. |
| 1-(4-hydroxy-phenyl)-2-phenyl-1,2,3,4-tetrahydro-naphthalene. | Sodium hydride+N,N-dimethylaminoisopropyl chloride. | 1-[4-(N,N-dimethylaminoisopropyl)-oxy-phenyl]-2-phenyl-1,2,3,4-tetrahydro-naphthalene. |
| 1-(4-hydroxy-phenyl)-2-phenyl-1,2,3,4-tetrahydro-naphthalene. | Sodium hydride+2-(1-piperidino)-ethyl chloride. | 2-phenyl-1-{4-[2-(1-piperidino)-ethyl]-oxy-phenyl}-1,2,3,4-tetrahydro-naphthalene. |
| 1-(4-hydroxy-phenyl)-2-phenyl-1,2,3,4-tetrahydro-naphthalene. | Sodium hydride+2-(4-methyl-1-piperazino)-ethyl chloride. | 1-{4-[2-(4-methyl-1-piperazino)-ethyl]-oxy-phenyl}-2-phenyl-1,2,3,4-tetrahydro-naphthalene. |
| 1-(4-hydroxy-phenyl)-2-phenyl-1,2,3,4-tetrahydro-naphthalene. | Sodium hydride+2-(4-morpholino)-ethyl chloride. | 1-{4-[2-(4-morpholino)-ethyl]-oxy-phenyl}-2-phenyl-1,2,3,4-tetrahydro-naphthalene. |
| 2-(4-chloro-phenyl)-1-(4-hydroxyphenyl)-1,2,3,4-tetrahydro-naphthalene. | Sodium hydride+3-N,N-dimethylaminopropyl chloride. | 2-(4-chloro-phenyl)-1-[4-(3-N,N-dimethylaminopropyl)-oxy-phenyl]-1,2,3,4-tetrahydro-naphthalene. |
| 2-(4-chloro-phenyl)-1-(4-hydroxyphenyl)-2-methyl-1,2,3,4-tetrahydro-naphthalene. | Sodium hydride+2-(1-pyrrolidino)-ethyl chloride. | 2-(4-chloro-phenyl)-2-methyl-1-{4-[2-(1-pyrrolidino)-ethyl]-oxy-phenyl}-1,2,3,4-tetrahydro-naphthalene. |
| 2-(4-chloro-phenyl)-1-(4 hydroxyphenyl)-1,2,3,4-tetrahydro-naphthalene. | Sodium hydride+2-(1-piperidino)-ethyl chloride. | 2-(4-chloro-phenyl)-1-{4-[2-(1-piperidino)-ethyl]-oxy-phenyl}-1,2,3,4-tetrahydro-naphthalene. |
| 1-(4-hydroxy-phenyl)-2-(4-methylphenyl)-1,2,3,4-tetrahydro-naphthalene. | Sodium hydride+2-N,N-diethylaminoethyl chloride. | 1-[4-(2-N,N-diethylaminoethyl)-oxy-phenyl]-2-(4-methyl-phenyl)-1,2,3,4-tetrahydro-naphthalene. |
| 2-(4-fluoro-phenyl)-1-(4-hydroxyphenyl)-1,2,3,4-tetrahydro-naphthalene. | Sodium hydride+2-(1-piperidino)-ethyl chloride. | 2-(4-fluoro-phenyl)-1-{4-[2-(1-piperidino)-ethyl]-oxy-phenyl}-1,2,3,4-tetrahydro-naphthalene. |
| 1-(4-hydroxy-phenyl)-2-(4-methoxyphenyl)-1,2,3,4-tetrahydro-naphthalene. | Sodium hydride+2-N,N-diethylaminoethyl chloride. | 1-[4-(2-N,N-diethylaminoethyl)-oxy-phenyl]-2-(4-methoxy-phenyl)-1,2,3,4-tetrahydro-naphthalene. |

| Starting Materials | Reagents | Products |
| --- | --- | --- |
| 1-(4-hydroxy-phenyl)-2-(4-methoxyphenyl)-1,2,3,4-tetrahydro-naphthalene. | Sodium hydride+2-(1-pyrrolidino)-ethyl chloride. | 2-(4-methoxy-phenyl)-1-{4-[2-(1-pyrrolidino)-ethyl]-oxy-phenyl}-1,2,3,4-tetrahydro-naphthalene. |
| 1-(4-hydroxy-phenyl)-2-(3-pyridyl)-1,2,3,4-tetrahydro-naphthalene. | Sodium hydride+2-N,N-diethylaminoethyl chloride. | 1-[4-(2-N,N-diethylaminoethyl)-oxy-phenyl]-2-(3-pyridyl)-1,2,3,4-tetrahydro-naphthalene. |
| 6-chloro-1-(4-hydroxy-phenyl)-2-phenyl-1,2,3,4-tetrahydro-naphthalene. | Sodium hydride+2-(4-methyl-1-piperazino)-ethyl chloride. | 6-chloro-1-{4-[2-(4-methyl-1-piperazino)-ethyl]-oxy-phenyl}-1,2,3,4-tetrahydro-naphthalene. |
| 7-chloro-1-(4-hydroxy-phenyl)-2-phenyl-1,2,3,4-tetrahydro-naphthalene. | Sodium hydride+2-N,N-diethylaminoethyl chloride. | 7-chloro-1-[4-(2-N,N-diethylaminoethyl)-oxy-phenyl]-2-phenyl-1,2,3,4-tetrahydro-naphthalene. |
| 7-chloro-1-(4-hydroxy-phenyl)-2-phenyl-1,2,3,4-tetrahydro-naphthalene. | Sodium hydride+2-(1-pyrrolidino)-ethyl chloride. | 7-chloro-2-phenyl-1-{4-[2-(1-pyrrolidino)-ethyl]-oxy-phenyl}-1,2,3,4-tetrahydro-naphthalene. |
| 7-chloro-2-(4-chloro-phenyl)-1-(4-hydroxy-phenyl)-1,2,3,4-tetrahydro-naphthalene. | Sodium hydride+2-N,N-diethylaminoethyl chloride. | 7-chloro-2-(4-chloro-phenyl)-1-[4-(2-N,N-diethylaminoethyl)-oxyphenyl]-1,2,3,4-tetrahydro-naphthalene. |
| 7-chloro-2-(4-chloro-phenyl)-1-(4-hydroxy-phenyl)-1,2,3,4-tetrahydro-naphthalene. | Sodium hydride+2-(1-pyrrolidino)-ethyl chloride. | 7-chloro-2-(4-chloro-phenyl)-1-{4-[2-(1-pyrrolidino)-ethyl]-oxy-phenyl}-1,2,3,4-tetrahydro-naphthalene. |
| 7-chloro-2-(4-chloro-phenyl)-1-(4-hydroxy-phenyl)-1,2,3,4-tetrahydro-naphthalene. | Sodium hydride+3-N,N-diethylaminopropyl chloride. | 7-chloro-2-(4-chloro-phenyl)-1-[4-(3-N,N-diethylaminopropyl)-oxyphenyl]-1,2,3,4-tetrahydro-naphthalene. |
| 1-(4-hydroxy-phenyl)-7-methyl-2-phenyl-1,2,3,4-tetrahydro-naphthalene. | Sodium hydride+2-N,N-diethylaminoethyl chloride. | 1-[4-(2-N,N-diethylaminoethyl)-oxy-phenyl]-7-methyl-2-phenyl-1,2,3,4-tetrahydro-naphthalene. |
| 1-(4-hydroxy-phenyl)-7-methyl-2-phenyl-1,2,3,4-tetrahydro-naphthalene. | Sodium hydride+2-(1-pyrrolidino)-ethyl chloride. | 7-methyl-2-phenyl-1-{4-[2-(1-pyrrolidino)-ethyl]-oxy-phenyl}-1,2,3,4-tetrahydro-naphthalene. |
| 2-(4,chloro-phenyl)-1-(hydroxyphenyl)-7-methyl-1,2,3,4-tetrahydro-naphthalene. | Sodium hydride+2-N,N-diethylaminoethyl chloride. | 2-(4-chloro-phenyl)-1-[4-(2-N,N-diethylaminoethyl)-oxy-phenyl]-7-methyl-1,2,3,4-tetrahydro-naphthalene. |
| 2-(4,chloro-phenyl)-1-(hydroxyphenyl)-7-methyl-1,2,3,4-tetrahydro-naphthalene. | Sodium hydride+2-(1-pyrrolidino)-ethyl chloride. | 2-(4-chloro-phenyl)-7-methyl-1-{4-[2-(1-pyrrolidino)-ethyl]-oxy-phenyl}-1,2,3,4-tetrahydro-naphthalene. |
| 1-(4-hydroxy-phenyl)-6-methoxy-2-phenyl-1,2,3,4-tetraphydro-naphthalene. | Sodium hydride+2-N,N-diethylaminoethyl chloride. | 1-[4-(2-N,N-diethylaminoethyl)-oxy-phenyl]-6-methoxy-2-phenyl-1,2,3,4-tetrahydro-naphthalene. |
| 1-(4-hydroxy-phenyl)-6-methoxy-2-(4-methoxy-phenyl)-1,2,3,4-tetrahydro-naphthalene. | Sodium hydride+2-(1-pyrrolidino)-ethyl chloride. | 6-methoxy-2-(4-methoxyphenyl)-1-{4-[2-(1-pyrrolidino)-ethyl]-oxy-phenyl}-1,2,3,4-tetrahydro-naphthalene. |
| 6,7-dimethoxy-1-(4-hydroxy-phenyl)-2-phenyl-1,2,3,4-tetrahydro-naphthalene. | Sodium hydride+2-N,N-diethylaminoethyl chloride. | 6,7-dimethoxy-1-[4-(2-N,N-dimethylaminoethyl)-oxy-phenyl]-2-phenyl-1,2,3,4-tetrahydro-naphthalene. |
| 6,7-dimethoxy-1-(4-hydroxy-phenyl)-2-phenyl-1,2,3,4-tetrahydro-naphthalene. | Sodium hydride+2-(1-pyrrolidino)-ethyl chloride. | 6,7-dimethoxy-2-phenyl-1-{4-[2-(1-pyrrolidino)-ethyl]-oxy-phenyl}-1,2,3,4-tetrahydro-naphthalene. |
| 1-(4-hydroxy-phenyl)-6,7-methylenedioxy-2-phenyl-1,2,3,4-tetrahydro-naphthalene. | Sodium hydride+2-N,N-diethylaminoethyl chloride. | 1-[4-(2-N,N-dimethylaminoethyl)-oxy-phenyl]-6,7-methylenedioxy-2-phenyl-1,2,3,4-tetrahydro-naphthalene. |
| 1-(4-hydroxy-phenyl)-6,7-methylenedioxy-2-phenyl 1,2,3,4-tetrahydro-naphthalene. | Sodium hydride+2-(1-pyrrolidino)-ethyl chloride. | 6,7-methylenedioxy-2-phenyl-1-{4-[2-(1-pyrrolidino)-ethyl]-oxy-phenyl}-1,2,3,4-tetrahydro-naphthalene. |
| 1-(3-chloro-4-hydroxy-phenyl)-2-phenyl-1,2,3,4-tetrahydro-naphthalene. | Sodium hydride+2-N,N-diethylaminoethyl chloride. | 1-[3-chloro-4-(2-N,N-diethylaminoethyl)-oxy-phenyl]-2-phenyl-1,2,3,4-tetrahydro-naphthalene. |
| 1-(3,5-dichloro-4-hydroxy-phenyl)-2-phenyl-1,2,3,4-tetrahydro-naphthalene. | Sodium hydride+2-N,(1,6-hexylene-imino)-ethyl chloride. | 1-{[3,5-dichloro-4-[2-N-(1,6-hexylene-imino)-ethyl]-oxy-phenyl}-2-phenyl-1,2,3,4-tetrahydro-naphthalene. |
| 1-(3,4-dihydroxy-phenyl)-2-phenyl-1,2,3,4-tetrahydro-naphthalene. | Sodium hydride+2-N,N-diethylaminoethyl chloride. | 1-[3,4-di-(2-N,N-diethylaminoethyl)-oxy-phenyl]-2-phenyl-1,2,3,4-tetrahydro-naphthalene. |
| 2-(2-chloro-phenyl)-1-(3,4-dihydroxy-phenyl)-1,2,3,4-tetrahydro-naphthalene. | Sodium hydride+2-N,N-diethylaminoethyl chloride. | 2-(2-chloro-phenyl)-1-[3,4-di-(2-N,N-diethylaminoethyl)-oxy-phenyl]-1,2,3,4-tetrahydro-naphthalene. |
| 1-(4-hydroxy-phenyl)-2-methyl-2-phenyl-indan. | Sodium hydride+2-N,N-diethylaminoethyl chloride. | 1-[4-(2-N,N-diethylaminoethyl)-oxy-phenyl]-2-methyl-2-phenyl-indan. |
| 1-(4-hydroxy-phenyl)-2-methyl-2-phenyl-indan. | Sodium hydride+2-(1-pyrrolidino)-ethyl chloride. | 2-methyl-2-phenyl-1-{4-[2-(1-pyrrolidino)-ethyl]-oxy-phenyl}-indan. |
| 2-(4-chloro-phenyl)-1-(4-hydroxyphenyl)-indan. | Sodium hydride+2-N,N-diethylaminoethyl chloride. | 2-(4-chloro-phenyl)-1-[4-(2-N,N-diethylaminoethyl)-oxy-phenyl]-indan. |
| 2-(4-chloro-phenyl)-1-(4-hydroxyphenyl)-indan. | Sodium hydride+2-(1-pyrrolidino)-ethyl chloride. | 2-(4-chloro-phenyl)-1-{4-[2-(1-pyrrolidino)-ethyl]-oxy-phenyl}-indan. |
| 2-(3,4-dichloro-phenyl)-1-(3-4-dihydroxy-phenyl)-indan. | Sodium hydride+2-N,N-diethylaminoethyl chloride. | 2-(3,4-dichloro-phenyl)-1-[3,4-di-(2-N,N-diethylaminoethyl)-oxy-phenyl]-indan. |
| 1-(4-hydroxy-phenyl)-6-methoxy-2-phenyl-indan. | Sodium hydride+2-N,N-diethylaminoethyl chloride. | 1-[4-(2-N,N-diethylaminoethyl)-oxy-phenyl]-6-methoxy-2-phenyl-indan. |
| 1-(4-hydroxy-phenyl)-6-methoxy-2-phenyl-indan. | Sodium hydride+2-(1-pyrrolidono)-ethyl chloride. | 6-methoxy-2-phenyl-1-{4-[2-(1-pyrrolidino)-ethyl]-oxy-phenyl}-indan. |
| 1-(4-hydroxy-phenyl)-2-phenyl-benzsuberane. | Sodium hydride+2-N,N-diethylaminoethyl chloride. | 1-[4-(2-N,N-diethylamino-ethyl)-oxy-phenyl]-2-phenyl-benzsuberane. |

What is claimed is:

1. A member selected from the group consisting of a compound of the formula

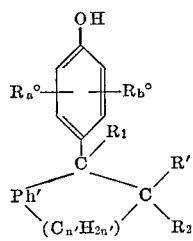

in which Ph' is a member selected from the group consisting of unsubstituted 1,2-phenylene and 1,2-phenylene substituted by 1 to 2 members selected from the group consisting of lower alkyl, lower alkoxy and halogeno, R' is a member selected from the group consisting of unsubstituted phenyl and phenyl substituted by a member selected from the group consisting of lower alkyl, lower alkoxy and halogeno, each of the groups $R_1$ and $R_2$ is a member selected from the group consisting of hydrogen and lower alkyl, the group of the formula $-(C_{n'}H_{2n'})-$ stands for ethylene, and each of the groups $R_a^o$ and $R_b^o$ is a member selected from the group consisting of hydrogen, halogeno and hydroxyl, and the alkali metal salts thereof.

2. A member selected from the group consisting of a compound of the formula

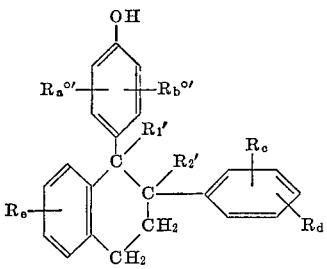

in which one of the groups $R_1'$ and $R_2'$ is a member selected from the group consisting of hydrogen and lower alkyl, and the other is hydrogen, each of the groups $R_a^{o'}$ and $R_b^{o'}$ is a member selected from the group consisting of hydrogen and hydroxyl, and each of the groups $R_c$, $R_d$ and $R_e$ is a member selected from the group consisting of hydrogen, lower alkyl, lower alkoxy and halogeno, and the alkali metal salts thereof.

3. 1-(4-hydroxy-phenyl)-2-phenyl - 1,2,3,4 - tetrahydronaphthalene.

4. 2 - (4-chloro-phenyl)-1-(4-hydroxy-phenyl)-1,2,3,4-tetrahydro-naphthalene.

5. 2-phenyl-1-(2,3,4 - trihydroxy - phenyl) - 1,2,3,4-tetrahydro-naphthalene.

6. 8-(3,4 - dichloro - phenyl) - 1 - (2,3,4 - trihydroxyphenyl)-1,2,3,4-tetrahydro-naphthalene.

References Cited

UNITED STATES PATENTS 2,444,233 6/1948 Soday _____ 260—619 X
3,293,263 12/1966 Lednicer _____ 260—619 X LEON ZITVER, Primary Examiner
N. P. MORGENSTEIN, Assistant Examiner U.S. Cl. X.R.

260—612, 613, 999

CASE SU-330/1+2/D/1+2

PO-1050
(5/69)

UNITED STATES PATENT OFFICE
CERTIFICATE OF CORRECTION

Patent No. 3,522,319         Dated July 28, 1970

Inventor(s) WILLIAM LASZLO BENCZE ET AL

It is certified that error appears in the above-identified patent and that said Letters Patent are hereby corrected as shown below:

Column 29, line 1, "8" should read --- 2 ---.

SIGNED AND
SEALED
DEC 29 1970

(SEAL)
Attest:

Edward M. Fletcher, Jr.
Attesting Officer

WILLIAM E. SCHUYLER, JR.
Commissioner of Patents